US011426030B2

(12) United States Patent
Reichelderfer et al.

(10) Patent No.: US 11,426,030 B2
(45) Date of Patent: Aug. 30, 2022

(54) AUTOMATIC FRYER WITH OIL-BASED PRODUCT MOVEMENT AND REDUCED OIL VOLUME

(71) Applicant: Henny Penny Corporation, Eaton, OH (US)

(72) Inventors: Kimberly Reichelderfer, Springfield, OH (US); Stephen L. Wilks, Trotwood, OH (US); Frederick Pansing, Brookville, OH (US); Steven V. Ricca, Upper Arlington, OH (US); Matthew A. Zeglen, Dayton, OH (US); Gregory J. Smith, Clayton, OH (US); Mark Gogel, Fairborn, OH (US)

(73) Assignee: Henny Penny Corporation, Eaton, OH (US)

( * ) Notice: Subject to any disclaimer, the term of this patent is extended or adjusted under 35 U.S.C. 154(b) by 423 days.

(21) Appl. No.: 16/640,199

(22) PCT Filed: Sep. 6, 2018

(86) PCT No.: PCT/US2018/049735
§ 371 (c)(1),
(2) Date: Feb. 19, 2020

(87) PCT Pub. No.: WO2019/051078
PCT Pub. Date: Mar. 14, 2019

(65) Prior Publication Data
US 2020/0178733 A1 Jun. 11, 2020

Related U.S. Application Data

(60) Provisional application No. 62/692,034, filed on Jun. 29, 2018, provisional application No. 62/554,862, filed on Sep. 6, 2017.

(51) Int. Cl.
*A47J 37/12* (2006.01)

(52) U.S. Cl.
CPC .......... *A47J 37/1214* (2013.01); *A47J 37/129* (2013.01); *A47J 37/1223* (2013.01); *A47J 37/1266* (2013.01)

(58) Field of Classification Search
CPC ........ A47J 37/00; A47J 37/12; A47J 37/1214; A47J 37/1223; A47J 37/1266; A47J 37/1276; A47J 37/129
(Continued)

(56) References Cited

U.S. PATENT DOCUMENTS 1,401,945 A 12/1921 Morris
1,690,104 A 11/1928 Denz et al.
(Continued)

FOREIGN PATENT DOCUMENTS

IT   M020110323      6/2013
JP   7058598 B2 *   4/2022   .......... A47J 37/1214
(Continued)

OTHER PUBLICATIONS

European Patent Office, Extended Search Report issued in EP Application No. 18854518.0-1004 dated Apr. 29, 2021 (18 pages).
(Continued)

*Primary Examiner* — Hoai-An D. Nguyen
(74) *Attorney, Agent, or Firm* — Wood Herron & Evans LLP

(57) ABSTRACT

A cooking system in the form of a fryer is provided to reduce and/or optimize the amount of cooking medium required to operate the fryer, while improving the reliability of movement of food product through the cooking system during a cooking process. To this end, the cooking vat of the system is designed with one or more heating elements positioned to avoid generation of turbulent flow in the cooking medium.
(Continued)

Moreover, the movement of food product along the cooking vat and/or out of the cooking vat is done reliably and in such a manner to avoid turbulent flow in the cooking medium. The automatic cooking system provides improved cooking medium life span as well as reduced overall oil volume use.

19 Claims, 25 Drawing Sheets

(58) Field of Classification Search
USPC .......................................... 99/324, 403, 404
See application file for complete search history.

(56) References Cited

U.S. PATENT DOCUMENTS

| | | | |
|---|---|---|---|
| 2,283,256 A | | 5/1942 | Husk |
| 3,608,472 A | * | 9/1971 | Pelster ................ A47J 27/0817 |
| | | | 210/167.28 |
| 4,228,730 A | | 10/1980 | Schindler et al. |
| 4,658,709 A | | 4/1987 | Anderson |
| 5,085,137 A | | 2/1992 | Mottur et al. |
| 5,617,777 A | * | 4/1997 | Davis ................... A47J 37/1223 |
| | | | 210/DIG. 8 |
| 6,736,130 B2 | | 5/2004 | Takahashi |
| 2002/0069767 A1 | | 6/2002 | Wendel et al. |
| 2005/0153022 A1 | | 7/2005 | Schilling et al. |
| 2013/0149425 A1 | | 6/2013 | Caridis et al. |
| 2019/0075969 A1 | * | 3/2019 | Florkey ............... A47J 37/1261 |

FOREIGN PATENT DOCUMENTS

| | | |
|---|---|---|
| KR | 20000032506 A | 6/2000 |
| SE | 521680 C2 | 11/2003 |
| WO | 2017078739 A1 | 5/2017 |

OTHER PUBLICATIONS

International Searching Authority, Search Report and Written Opinion issued in International Application No. PCT/US2018/049735 dated Nov. 30, 2018 (14 pages).

\* cited by examiner

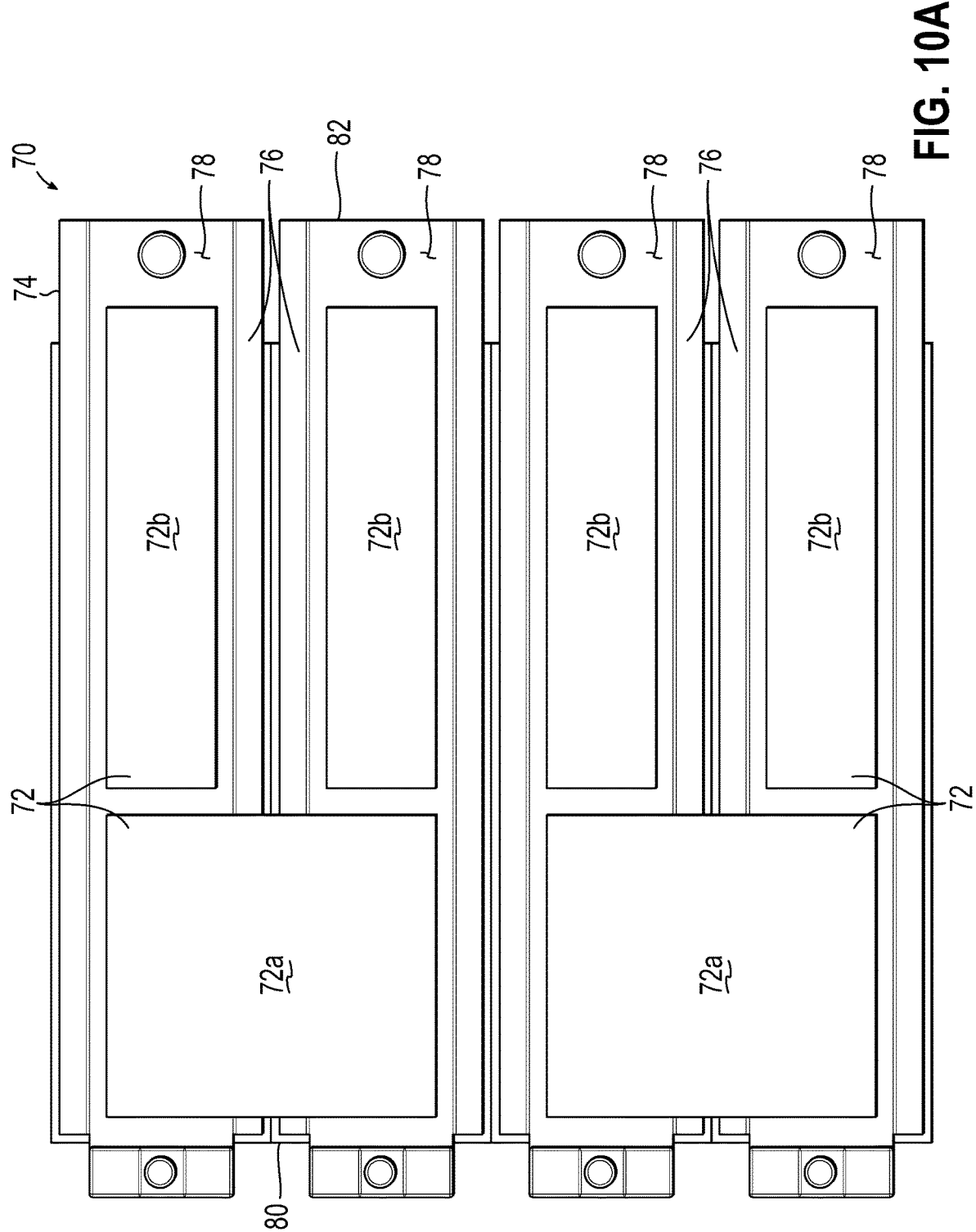

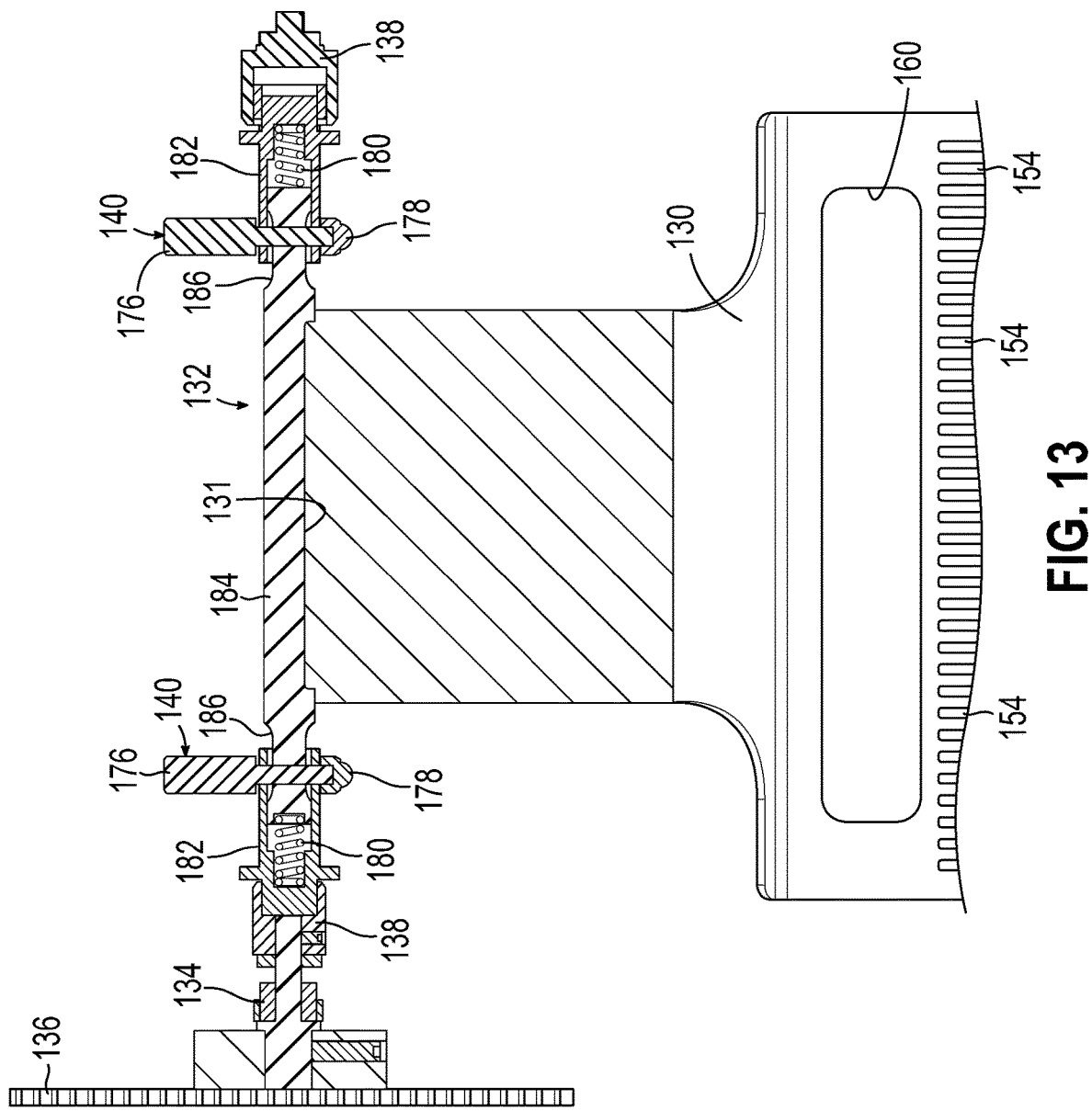

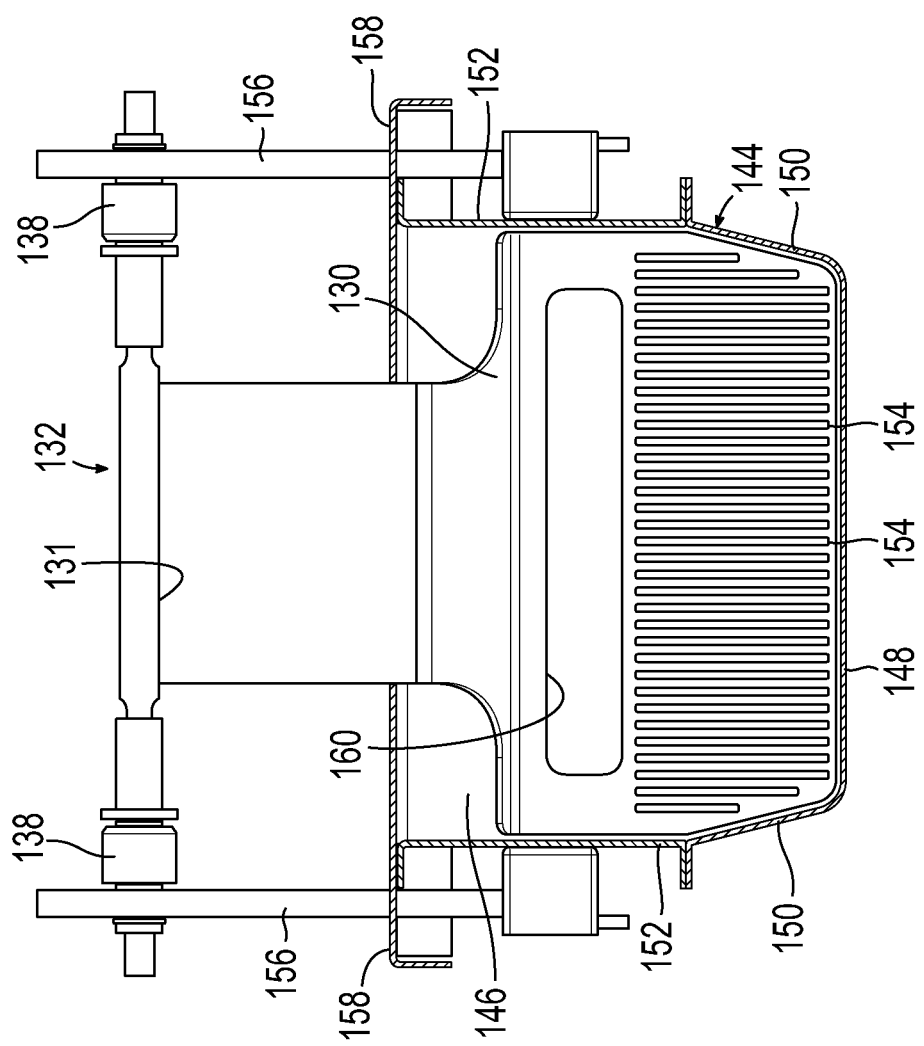

AUTOMATIC FRYER WITH OIL-BASED PRODUCT MOVEMENT AND REDUCED OIL VOLUME

CROSS-REFERENCE TO RELATED APPLICATIONS

This application is a national phase application of, and claims priority to, International Patent Application No. PCT/US2018/049735, filed on Sep. 6, 2018, which claims the benefit of U.S. Provisional Application Ser. No. 62/554,862, filed Sep. 6, 2017, and also the benefit of U.S. Provisional Application Ser. No. 62/692,034, filed Jun. 29, 2018, the disclosures of which are incorporated by reference herein.

TECHNICAL FIELD

The invention generally relates to systems and methods for automatically heating and cooking food products using cooking medium in a cooking apparatus, such as a fryer and, more particularly, to systems and methods for reducing and/or optimizing the cooking medium usage of such fryers.

BACKGROUND

Oil-based frying is commonly used as a cooking method for a wide range of food, such as poultry, fish, potato products, and the like. Commercial fryers include one or more fry pots (also referred to as cooking chambers) that are filled with a cooking medium such as oil or solid fats. Heat is typically provided to the cooking medium using an electrical heating element submerged in the cooking medium or a gas burner thermally coupled to the cooking medium through the walls of the fry pot. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container, such as a wire basket, and the container lowered into the cooking medium for the predetermined amount of time.

Thus, many conventional systems rely on manual intervention to move food products into, out of, and through a fryer. Such manual intervention can be undesirable. Even in recently-developed automated systems for moving the food product, the automatic movement systems have been highly complex and expensive, as well as sometimes harsh on the food product being moved through the fryer. As such, it is desired to improve methods of moving food product through a cooking system in these circumstances to improve reliability and reduce complexity and damage to the food product.

The cooking medium of a conventional fryer is normally re-used for multiple cooking cycles, which may include cooking cycles for different food products. However, the cooking medium degrades over time. This degradation may be due to contamination by particles shed by the food products being cooked and from chemical degradation due to heat, oxidation, and reactions with the food products. In addition, as food particles accumulate in the cooking medium, the flavor characteristics of the food particles may become infused in the cooking medium. This infusion may adversely affect the quality of cooked food. For at least these reasons, the cooking medium must occasionally be replaced and/or filtered. Known contemporary filtering systems require the operator to manipulate manual valves to route the cooking medium through the filter and to return it to a cooking vessel, e.g., a frypot, disposed within the fryer. Even experienced operators may open or close the valves incorrectly, which increases operating expenses through lost time. Periodically, the drain pan under the fryer may be removed for cleaning or to discard the cooking medium. If the operator forgets to replace the drain pan and opens the drain valve, the cooking medium drains onto the floor and is wasted, which greatly increases operating expenses.

Fryer manufacturers have recently developed improved fryer systems and methods to help address some of the shortcomings with conventional food product movement and filtration systems as set forth above. For example, the original assignee/Applicant of this application developed an automated fryer as shown in FIGS. 1 and 2 and described in International Patent Publication No. WO 2017/078739, entitled "Automatic Fryer," the entire disclosure of which is hereby incorporated by reference herein. This fryer moves food products using a continuous flow of cooking medium through a series of gates, and the gates are selectively opened to allow batches of food product to move from portion to portion along the length of the fryer. The continuous flow of cooking medium is driven by a recirculating pump system, and the cooking medium is therefore continuously filtered during cooking operations. Technical advantages of this design include improved temperature uniformity of the cooking medium for all food products because the cooking medium is being continuously circulated, and the removal of manual food product movement with baskets. This fryer design improves the functionality and operation of conventional fryers, but further improvements and refinements of the design continue to be desirable. For example, the oil life span for this fryer design can be relatively short (when no "top off" procedure is used) and therefore could be improved.

Accordingly, it is desirable to further reduce and/or optimize the amount of cooking medium required to operate the fryers, while improving the temperature and/or flow characteristics of cooking medium in automated fryers, as well as the reliability of moving food product through a fryer in a cooking process.

SUMMARY

According to one embodiment of the invention, an automatic cooking system for frying food products is provided to address some of the technical objectives set forth above. To this end, the system includes a cooking vat configured to hold a cooking medium and to receive food product. The cooking vat defines at least one lane extending between an inlet end where the food product is inserted into the cooking vat and an outlet end where the food product is removed from the cooking vat. Each lane of the cooking vat includes a bottom surface and sidewalls extending along the lane, with chamfered corner surfaces connecting to the bottom surface and the sidewalls at an angle. The system also includes a heating element coupled to the cooking vat and configured to transfer heat into the cooking medium to uniformly heat the cooking medium. An oil recirculation and filtration system is also included, with a pump in communication with the inlet and outlet ends of the cooking vat so as to generate a continuous flow of cooking medium from the inlet end to the outlet end. The system further includes at least one gate in the cooking vat that separates the lane into separate portions. Each gate is configured to allow cooking medium flow therethrough and is also configured to move between a closed position blocking flow of food product between adjacent portions of the lane and an open position permitting flow of food product driven by the continuous flow of cooking medium past the gate to an adjacent portion of the lane. The heating element and the at least one gate are positioned and configured to avoid impeding of the continuous flow in the lane in such a manner that would generate turbulent flow. The flow of cooking medium over the bottom surface and chamfered corner surfaces and through the lane avoids turbulence that can oxidate and reduce life span of the cooking medium.

In one aspect, the cooking vat is subdivided into separate portions by at least two gates.

In another aspect, the bottom surface of each lane in the cooking vat is angled upwardly along at least a portion of the length from the inlet end to the outlet end. In some embodiments, this upward angling is along an entire length from the inlet end to the outlet end.

In yet another aspect, the heating element is positioned on an external side of the cooking vat so as to transfer heat energy by conduction through the cooking vat and into the cooking medium.

In a further aspect, the heating element is positioned within the cooking vat along the bottom surface so as to transfer heat energy directly into the cooking medium, and the heating element defining a low profile to avoid impedance of the continuous flow of cooking medium in the lane.

In some embodiments, each lane is approximately 6 inches wide between the sidewalls and approximately 5 inches wide at the bottom surface, so as to contain about 10 pounds of cooking medium volume.

In one aspect, each gate is rotatably coupled with the cooking vat to pivot between the closed and open positions. To this end, each gate is coupled to a support rod that defines a rotational axis for movement of the gate, the support rod being configured to be driven rotationally by a drive. In some embodiments, each gate is removably coupled to the cooking vat so as to allow for removal of the gate and cleaning of the cooking vat. For example, each gate includes a spring release mechanism for selectively and removably engaging the gate to the cooking vat.

In another aspect, each gate includes a plurality of flow apertures to allow the continuous flow of cooking medium through a length of the lane without generation of turbulence in the flow of cooking medium.

According to another embodiment of the invention, an automatic cooking system for frying food products is provided. This embodiment of the system includes a cooking vat configured to hold a cooking medium and to receive food product, the cooking vat defining at least one lane extending between an inlet end where the food product is inserted into the cooking vat and an outlet end where the food product is removed from the cooking vat. The system also includes a heating element coupled to the cooking vat and configured to transfer heat into the cooking medium. A dividing and movement device is located in the cooking vat, which divides the lane into separate portions, and also selectively actuates to automatically and positively move batches of the food product between the separate portions of the lane as well as out of the cooking vat from the outlet end when a cooking process is completed. Several potential types of dividing and movement devices can be used.

In one such example, the device is provided by a series of baskets positioned sequentially along a length of the lane, wherein each basket is pivotally coupled to the cooking vat so that each basket can rotate between a first position in which a batch of the food product is held in a corresponding portion of the lane for cooking, and a second position in which the batch of the food product is moved into another portion of the lane or out of the cooking vat. Each basket includes a rear wall and sidewalls that form a chute-like structure for moving the batch of the food product into another portion of the lane or out of the cooking vat.

In another such example, the device is provided by a conveyor including a belt that extends along a length of the lane and paddles that project outwardly from the conveyor, wherein the paddles divide the lane into separate portions, and the conveyor rotates to move the paddles along the lane to move batches of the food product. The cooking system may also include an outlet basket positioned to receive a batch of the food product from the conveyor following a cooking process, the outlet basket configured to rotate relative to the cooking vat to remove the batch of the food product from the cooking vat.

In a further example, the device is provided by a series of gates positioned sequentially along a length of the lane, wherein each gate is pivotally coupled to the cooking vat so that each gate can rotate to selectively hold batches of the food product in a corresponding portion of the lane for cooking, and then selectively and positively move the batches of the food product into another portion of the lane. The cooking system may also include an outlet basket positioned to receive a batch of the food product from the series of gates following a cooking process, the outlet basket configured to rotate relative to the cooking vat to remove the batch of the food product from the cooking vat. Each of the gates is either flexible or spring-loaded so as to allow complete contact with adjacent portions of the cooking vat during rotation to move the batches of the food product.

In accordance with another embodiment of the invention, an automatic cooking system for frying food products is provided. The system includes a cooking vat configured to hold a cooking medium and to receive food product, the cooking vat defining at least one lane extending between an inlet end where the food product is inserted into the cooking vat and an outlet end where the food product is removed from the cooking vat, wherein each lane of the cooking vat includes a bottom surface and sidewalls extending along the lane. The cooking system also includes a heating element coupled to the cooking vat and configured to transfer heat into the cooking medium. An oil recirculation and filtration system is provided, including a pump in communication with the inlet end and the outlet end of the cooking vat, the oil recirculation system configured to generate a continuous flow of cooking medium from the inlet end to the outlet end. The system further includes at least one gate located in the cooking vat and separating the at least one lane into separate portions, each gate being configured to allow cooking medium flow therethrough, and also being configured to move between a closed position blocking flow of food product between adjacent portions of the lane and an open position permitting flow of food product driven by the continuous flow of cooking medium past the gate to an adjacent portion of the lane. Each gate is removably coupled to the cooking vat so as to allow for removal of the gate and cleaning of the cooking vat, and wherein each gate includes a spring release mechanism for selectively and removably engaging the gate to the cooking vat.

In one aspect, each gate is rotatably coupled with the cooking vat to pivot between the closed and open positions. In another aspect, each gate is coupled to a support rod that defines a rotational axis for movement of the gate, the support rod being configured to be driven rotationally by a drive.

In a further embodiment of the invention, a method for automatically cooking food products is provided. The method includes heating a cooking medium within a cooking vat to maintain a temperature of the cooking medium and delivering a batch of food product into an inlet end of the cooking vat. The method also includes maintaining the batch of food product in a first section of a lane defined within the cooking vat and extending along a length between the inlet end and an outlet end. The batch of food products is moved from the first section of the lane to a second section of the lane located closer to the outlet end than the first section. The method also includes maintaining the batch of food product in the second section of the lane and transferring the batch of food product out of the cooking vat from the outlet end. The movement of batches of food product through the cooking vat is performed in such a manner to avoid turbulence in the cooking medium that can oxidate and reduce life span of the cooking medium.

In one aspect, the method also includes circulating the cooking medium through the cooking vat using a pump to produce a continuous flow of cooking medium along the lane. The moving of the batch of food product is performed by the continuous flow of cooking medium.

In alternative aspects, the moving of the batch of food product is performed by a dividing and movement device located in the cooking vat, which divides the lane into separate portions, and also selectively actuates to automatically and positively move batches of the food product between the separate portions of the lane as well as out of the cooking vat from the outlet end when a cooking process is completed.

In some embodiments, a total volume of cooking medium contained in each lane of the cooking vat is sized to enable pull off of 10% to 20% of the total volume for every hour of cooking operation, thereby allowing for periodic top off with new cooking medium of 10% to 20% every hour. For example, each lane in the cooking vat may contain a total cooking medium volume of 9 to 12.5 pounds. The heating element can be defined by a heater rod cast in an aluminum bar casing, a printed think profile heater, or other known heating devices. It will be understood that the various aspects and embodiments described above and throughout this application may be combined in any combination and sub-combination without departing from the scope of the invention.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

FIG. 10A is a schematic bottom view of the cooking vat of FIG. 7, with a first configuration for heating elements.

FIG. 13 is a front cross-sectional view of the top end of the gate of FIG. 12A, showing additional elements of a support rod and a spring release mechanism associated with the gate.

FIG. 14 is a front cross-sectional view of the cooking vat of one embodiment of the invention with the rotatable gate of FIG. 12A located in a blocking position.

DETAILED DESCRIPTION

Embodiments of the invention are directed to automatic cooking systems and methods of controlling a fryer, which reduce and/or optimize the amount of cooking medium required to operate the fryers, while improving the temperature and/or flow characteristics of cooking medium in automated fryers. To this end, the cooking vat of the system is designed with one or more heating elements out of the path of flow for cooking medium and/or food products, and multiple lanes for flow of cooking medium and/or food products, thereby reducing the total volume of retained cooking medium used in the cooking process. Moreover, the use of continuous oil flow and filtration in combination with the new profiles of the lanes in the cooking vat can reduce or remove altogether the need to discard used oil when a periodic top off with new oil/cooking medium is required. Furthermore, food product movement along the length of the lanes in the cooking vat is more reliably achieved using all embodiments of this invention. By improving the product movement characteristics and uniform heat transfer into the cooking medium in the automatic cooking system, the embodiments described herein help minimize waste of cooking medium and food products and therefore operate more efficiently than conventional fryer designs.

Figure 1:
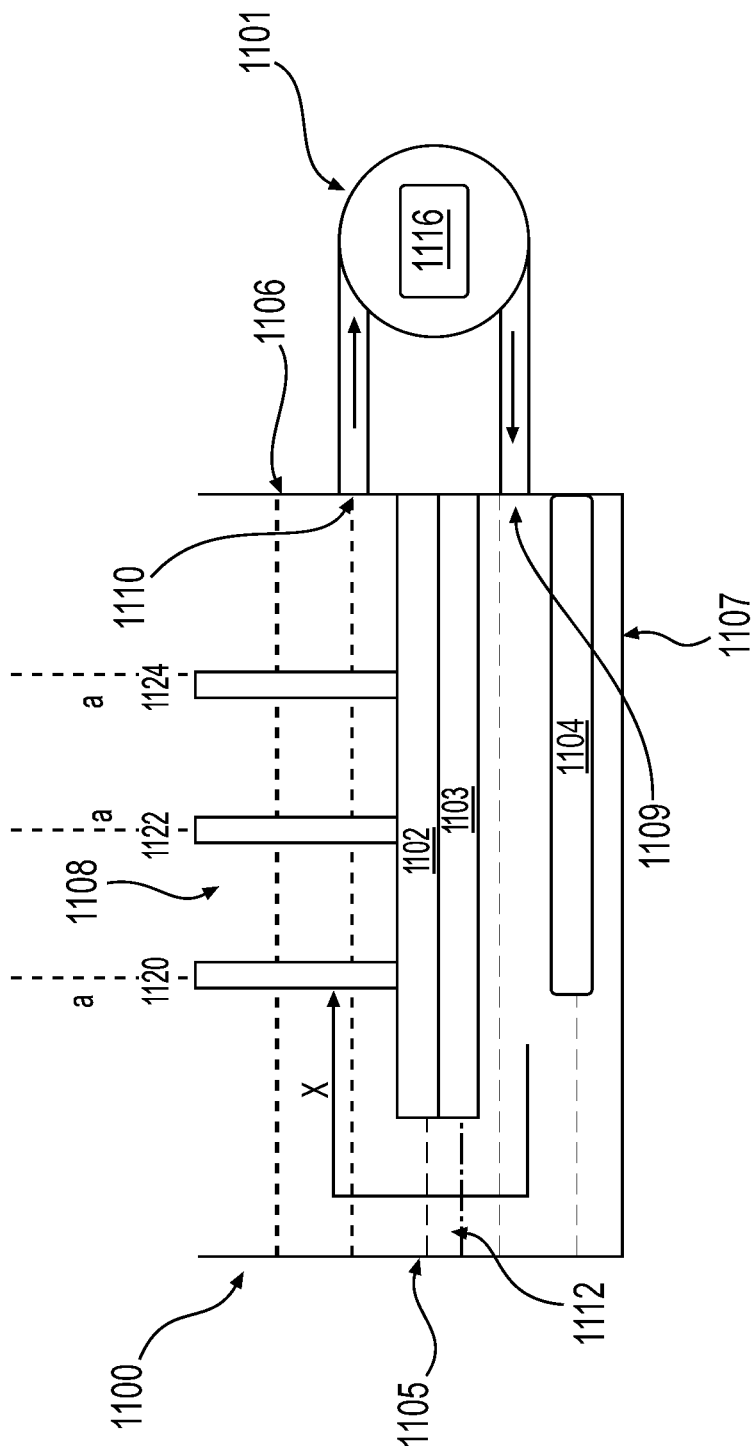
FIG. 1 is a schematic view of an automatic cooking and filtering system in a Prior Art fryer initially referenced in the Background Section above (from WO 2017/078739).
Figure 2:
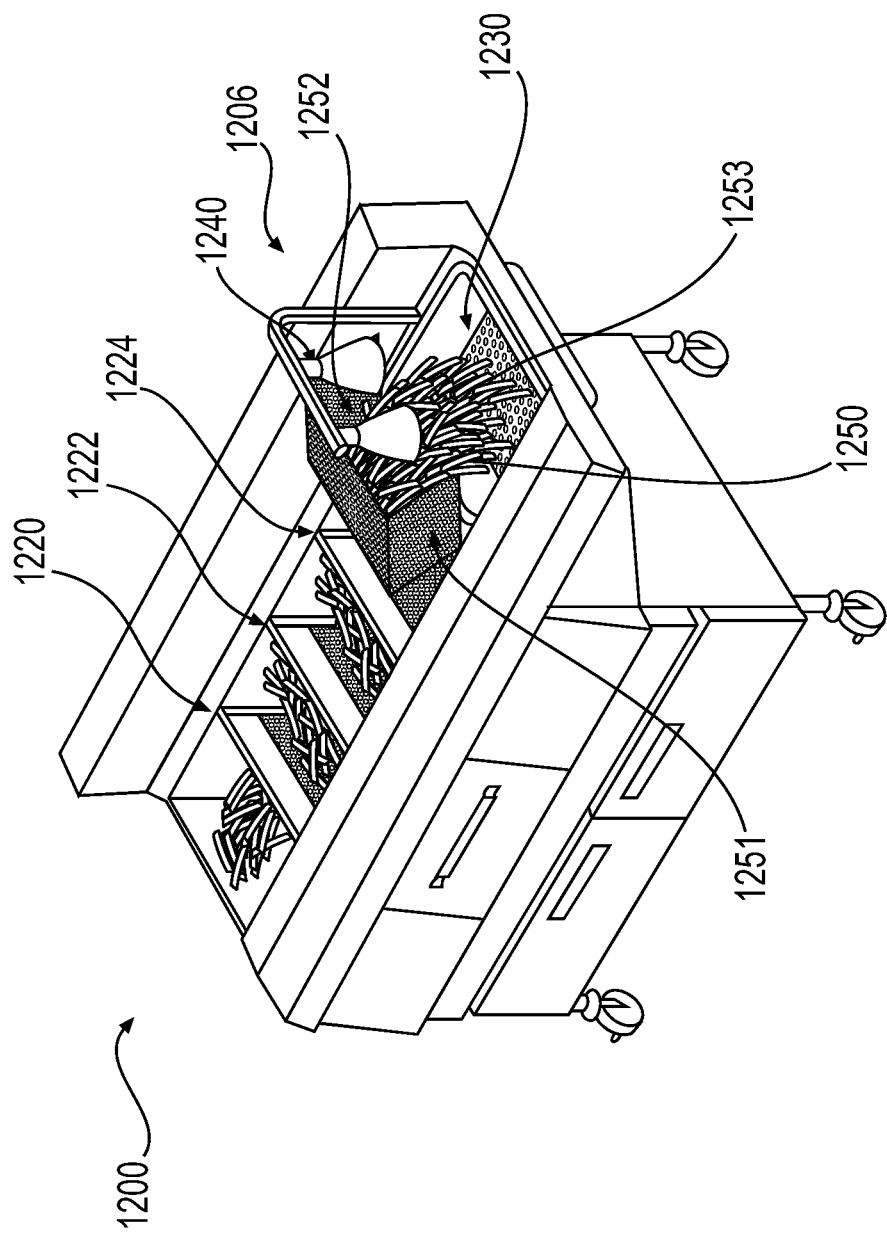
FIG. 2 is a perspective view of another embodiment of the automatic cooking and filtering system in the Prior Art fryer initially referenced in the Background Section above.
Figure 3:
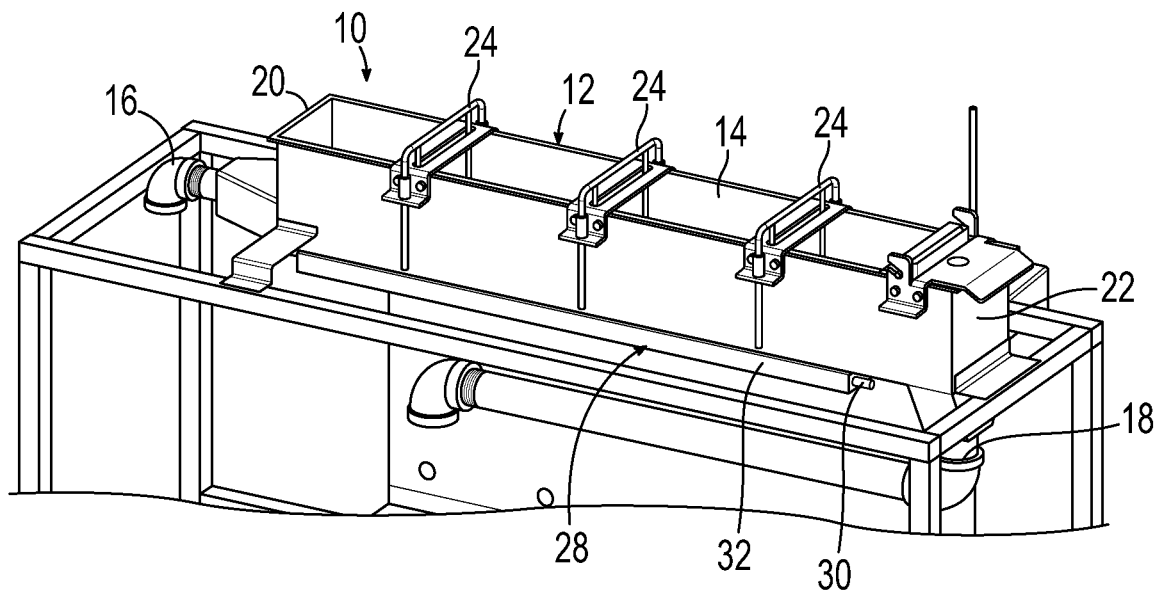
FIG. 3 is a top perspective view of an automatic cooking system in accordance with one embodiment of this invention, the automatic cooking system including one lane defined by a cooking vat.
Figure 4:
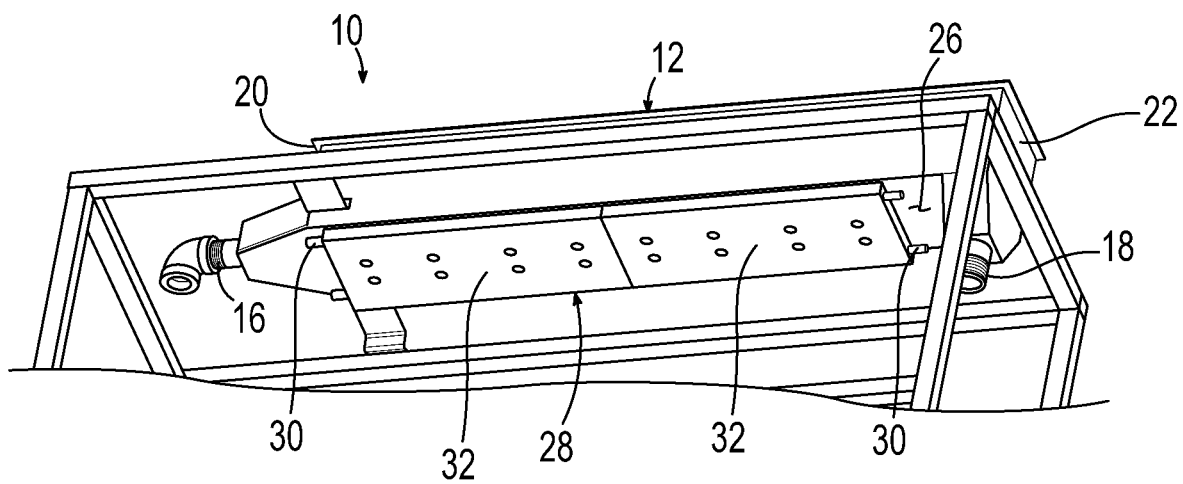
FIG. 4 is a bottom perspective view of the cooking vat included in the automatic cooking system of FIG. 3.
Figure 5:
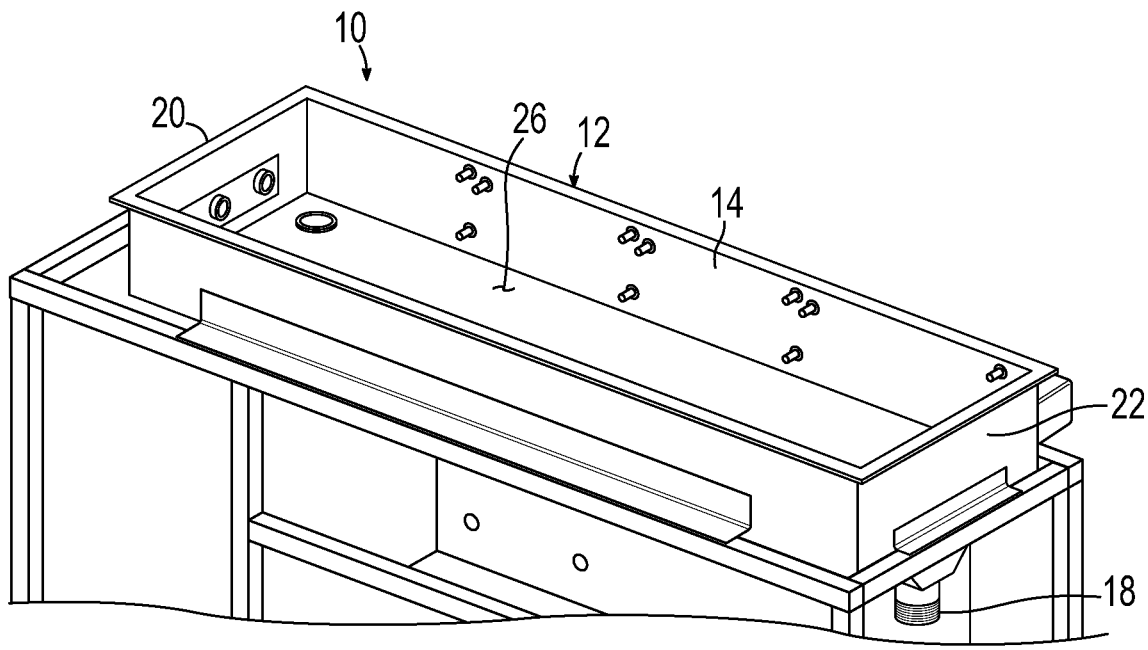
FIG. 5 is a further top perspective view of the cooking vat of the automatic cooking system of FIG. 3, with the gates removed from view.
Figure 6:
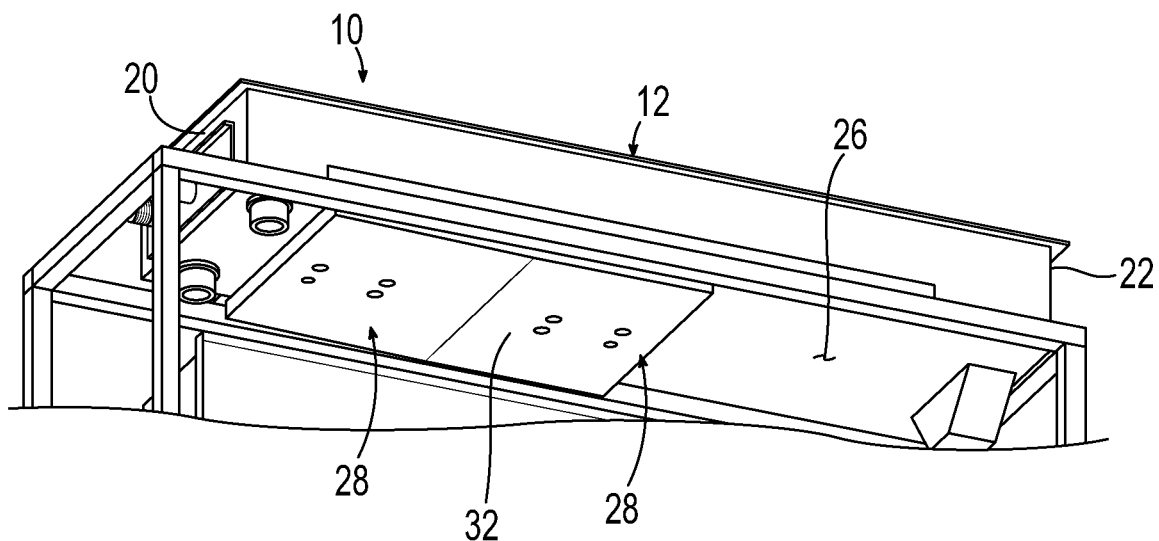
FIG. 6 is a further bottom perspective view of the cooking vat of FIG. 5.

Turning with specific reference to the drawings, FIGS. 1 and 2 show embodiments of the Prior Art fryer apparatus 1100, 1200 developed by the Applicant of this application, and which several embodiments of the current invention further improve and refine. The following description of these Figures is incorporated from the WO 2017/078739 published application for the purposes of explaining some of the primary functionalities and features of automatic cooking systems, many of which are retained in the embodiments of the current invention described below.

Referring to FIG. 1, fryer apparatus 1100 may be defined by inlet end wall 1105, outlet end wall 1106, sidewalls, and bottom surface 1107. Fryer apparatus 1100 may be configured to hold cooking medium 1108. Cooking medium 1108 may be oil, a liquid shortening, a meltable-solid shortening, or the like. Fryer apparatus 1100 may include a false bottom 1102, which may rest on a ledge 1103. The ledge 1103 may be connected to outlet end wall 1106. False bottom 1102 may be lifted off ledge 1103 to facilitate easy cleaning of the fryer apparatus 1100.

Cooking medium 1108 may be circulated through the fryer apparatus 1100 by a pump 1101 in a flow direction X to create a flume that transports food product throughout the cooking process. To this end, food product movement in this design of fryer apparatus 1100 is primarily accomplished with flow of cooking medium. Cooking medium 1108 may enter the fryer apparatus 1100 through pump outlet 1109, flow in direction X through the fryer apparatus 1100, and back into the pump 1101 through pump inlet 1110. Any suitable pump may be implemented for pump 1101, including, but not limited to, a centrifugal pump, a gear pump, a vane pump, a roller pump, or a diaphragm pump. A filter manifold 1116 may be disposed such that the cooking medium 1108 passes through the filter manifold 1116 as it flows in direction X between pump inlet 1110 and pump outlet 1109.

To facilitate the circulation of cooking medium 1108, false bottom 1102 and ledge 1103 may be spaced from inlet end wall 1105. A filter 1112 may connect ledge 1103 to inlet end wall 1105. The filter 1112 may be perforated sheet metal or any other suitable material configured to allow oil to flow from pump outlet 1109 to pump inlet 1110 in flow direction X. The filter 1112 is configured to prevent the food products from sinking below false bottom 1102 and ledge 1103 and to ensure the food products flow in direction X, along the flow of cooking medium 1108. Upon reaching outlet end wall 1106, the food products may be transferred to a holding station (not shown). A second filter (not shown) prevents food products from entering pump inlet 1110. The filter manifold 1116 may include another filtering mechanism, such as a paper filter, metal mesh, or other mechanism suitable for use with heated cooking medium. Filter manifold 1116 may be removable for easy cleaning of accumulated filtered particles. A heating element 1104 may be disposed in fryer apparatus 1100 for heating the cooking medium 1108. The heating element 1104 may be an electric heater or any other suitable heating mechanism.

The flow of food products from inlet end wall 1105 to outlet end wall 1106 may be controlled by a plurality of gates. First gate 1120, second gate 1122, and third gate 1124 are each in a lowered position when the food products are placed in the fryer apparatus 1100. In the lowered position, the first gate 1120, second gate 1122, and third gate 1124 may each be in contact with the false bottom 1102, or located relative to the false bottom 1102 such that food product does not pass by the first gate 1120, second gate 1122, or third gate 1124 in the lowered position. First gate 1120 will prevent the food products from continuing to move in flow direction X until first gate 1120 is raised. After a predetermined period of time, first gate 1120 may be raised and the food products may continue to flow in direction X due to the flow of the cooking medium 1108. After a second predetermined period of time, first gate 1120 may be lowered. At this time, the food products are located in the cooking medium 1108 between first gate 1120 and second gate 1122. After a third predetermined period of time, second gate 1122 is raised and the food products may continue to flow in direction X due to the flow of the cooking medium 1108. After a fourth predetermined period of time, second gate 1122 may be lowered. The food products are then located in the cooking medium 1108 between second gate 1122 and third gate 1124. Similarly, after a fifth predetermined period of time, third gate 1124 may be raised and the food products may continue to flow in direction X due to the flow of the cooking medium 1108. After a sixth predetermined period of time, third gate 1124 may be lowered and the food products may be automatically transferred to a holding station (not shown) upon reaching outlet end 1106. Gates 1120, 1122, 1124 may be raised and lowered along direction a.

Actuating the gates may occur by any suitable mechanism that blocks the flow of food products in one position, and allows food products to flow downstream of the gate in a second position. Actuating gates 1120, 1122, 1124 by raising and lowering the gates is one exemplary embodiment from the prior design. Alternatively, gates 1120, 1122, 1124 may be actuated to swing open about a pivot point. One example of such pivotable or rotatable gates is described below in connection with embodiments of the present invention. Regardless of the gate design used, the cooking process using gates 1120, 1122, 1124 may allow cooking of multiple batches of food product to increase the output of fryer apparatus 1100.

Referring to FIG. 2, a fryer apparatus 1200 according to another embodiment of the Prior Art system is depicted. Fryer apparatus 1200 may include first gate 1220, second gate 1222, third gate 1224 and a holding station 1230 at an outlet end 1206. After flowing downstream of third gate 1224, food products are automatically transferred to the holding station 1230. The fryer apparatus 1200 may include a heat lamp 1240. The food products may be transferred to the holding station 1230 by any suitable means, including a basket 1250. Basket 1250 may be rotated to transfer the food products into the holding station 1230. In one exemplary embodiment, the basket 1250 is defined by a first sidewall 1251, a second sidewall 1252, and a downstream wall 1253. This arrangement leaves the basket 1250 open at the upstream end, which is adjacent to the third gate 1224. The open end allows the food products to flow downstream of the third gate and into the outlet end 1206 of the fryer apparatus 1200. The first sidewall 1251, second sidewall 1252, and downstream wall 1253 may be perforated to allow excess oil cooking medium to drain before the food products are transferred to the holding station 1230.

With reference to FIGS. 3 through 6, a first embodiment of the automatic cooking system 10 of the current invention is shown in further detail. The system 10 includes a cooking vat 12 with one lane 14 for cooking medium and food product movement, but it will be appreciated that more than one of the lanes 14 may be provided in larger versions of the cooking vat 12. The cooking vat 12 is shown empty in these Figures. As with the designs of FIGS. 1 and 2, the cooking vat 12 includes a pump (not shown) and an oil recirculation system (not shown except for inlet and outlet pipes 16, 18 extending from the cooking vat) to generate a continuous flow of cooking medium from an inlet end 20 of the cooking vat 12 to an outlet end 22 of the cooking vat 12. Food products move from portion to portion along the lane 14 of the cooking vat 12 because of the cooking medium flow, with control of the food product movement provided by the series of gates 24 shown in FIG. 3. The gates 24 are perforated and otherwise function in a similar manner as locks on a river. Thus, the food products can be retained in the heated cooking medium for a time sufficient for fully cooking the food products, and then the food products can be removed from the outlet end 22 of the cooking vat 12 at the completion of the cooking cycle. The cooking methodology and the use of continuous oil flow/filtration and gates is similar to the example described above, but other features are added or re-designed as follows.

As shown in FIGS. 3 through 6, the lane 14 of the cooking vat 12 in this embodiment is generally rectangular in cross-section, having a bottom surface 26 that is 12 inches wide between the corners of the cooking vat 12, in one example. To reduce the amount of cooking medium volume within the cooking vat 12, the heating elements 28 are provided on the exterior of the cooking vat 12. The heating elements 28 include a rod heater 30 cast into an aluminum bar 32 (or block), which is then coupled in face-to-face abutting contact with the bottom surface 26 of the cooking vat 12. The heating elements 28 therefore transfer heat energy by conduction through the cooking vat 12 and into the cooking medium. By placing the heating elements 28 along an exterior of cooking vat 12, the cooking medium and food products do not need to flow around the heating elements 28 and turbulent flow is reduced/avoided, which reduces oxidation of the cooking medium and thereby improves cooking medium lifespan.

In the example shown with a 12-inch wide lane, a heating element configured to output 7 to 8 kW was sufficient in testing results to heat the cooking medium in the cooking vat 12 to an operating temperature of at least 350° F. and maintain the cooking medium at that temperature through multiple cooking cycles of food products. The large contact surface between the cast bar 32 of the heating elements 28 and the bottom surface 26 advantageously generates a uniform heat transfer and temperature in the shallow pool of cooking medium within the cooking vat 12. The exemplary cooking vat 12 shown in this embodiment requires approximately 35 pounds of cooking medium per lane 14, to provide an oil depth of 1.5 inches, which provides desirable flow of batches of food products (of approximately 0.75 pounds) from gate to gate 24 when the cooking medium is circulated using the oil recirculation system. Likewise, this embodiment of the automatic cooking system 10 reduces oil use compared to conventional fryer designs like the one shown in FIGS. 1 and 2, while also improving oil life, e.g., the total length of time or number of cooking cycles that can be performed before cooking medium replacement is required.

In testing of the embodiments of the automatic cooking system, several design parameters have been reviewed to evaluate effects on oil use and oil life span. For example, different heating methods such as heated air convection instead of the cast aluminum bar heating elements were tested, but these did not have any significant effect on oil life, so the most efficient heat transfer has been chosen (provided by the cast aluminum bar heating elements or low-profile heating elements such as printed heating elements described in further embodiments below). The pump in the oil recirculation system was also modified, using a gear pump and a centrifugal pump in different tests. These different pumps provided no discernable effect on oil life span, so the centrifugal pump has been chosen for these embodiments to reduce noise output and to enable a varying, controlled oil flow rate. The varying oil flow rate is enabled because of the variable frequency drive used with the centrifugal pump.

The test results have led to the conclusion that oil life span is primarily affected by oxidation effects. In addition, removal of turbulent oil flows and a reduction of the ratio of surface area to oil volume are believed to assist with improving cooking medium life span. One design parameter that has been proven to help with extending cooking medium life span is the use of "top off" with new cooking medium. According to further testing, increasing a top off percentage of the total oil volume in the cooking vat per hour of operation of the cooking process significantly improves oil life, up to about 20% top off. Above this 20% top off value, the further benefits to oil life span are not significant for the amount of additional new cooking medium that would be periodically added to the system. It will be understood that if a corresponding amount of cooking medium has not been pulled off by the cooking of the food products in the time period before a top off, some amount of used cooking medium would also need to be removed and discarded from the system so that the same amount of cooking medium volume remains for further operations following the top off. This discarding of cooking medium is a waste factor that should be minimized, if possible. Alternatively, if used oil is not removed from the cooking system during a top off, then the result of less "pull off" caused by the cooking operations is a lower percent of top off that happens to refill the cooking vat to the necessary depth, which is undesirable for oil life considerations.

Figure 7:
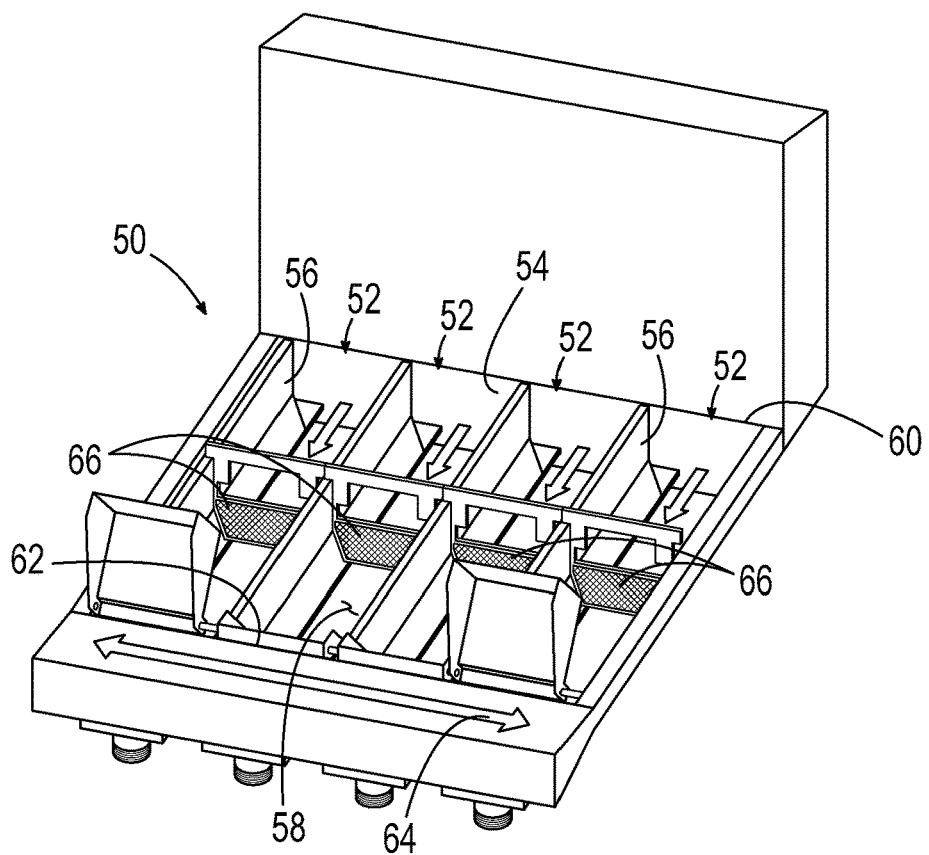
FIG. 7 is a top perspective view of another embodiment of the automatic cooking system of this invention, the automatic cooking system including a cooking vat with four split lanes for cooking medium and food products.
Figure 8:
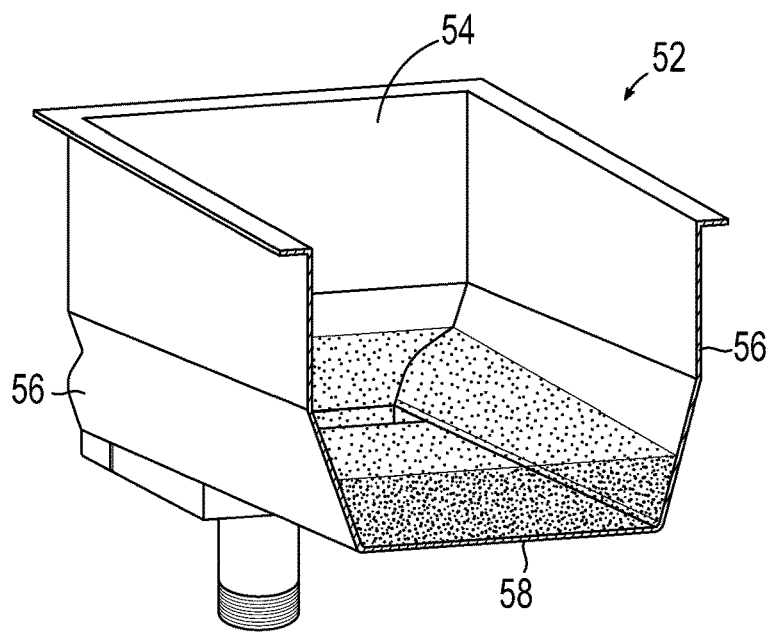
FIG. 8 is a front cross-sectional perspective view of one of the lanes of the cooking vat in the automatic cooking system of FIG. 7.
Figure 9:
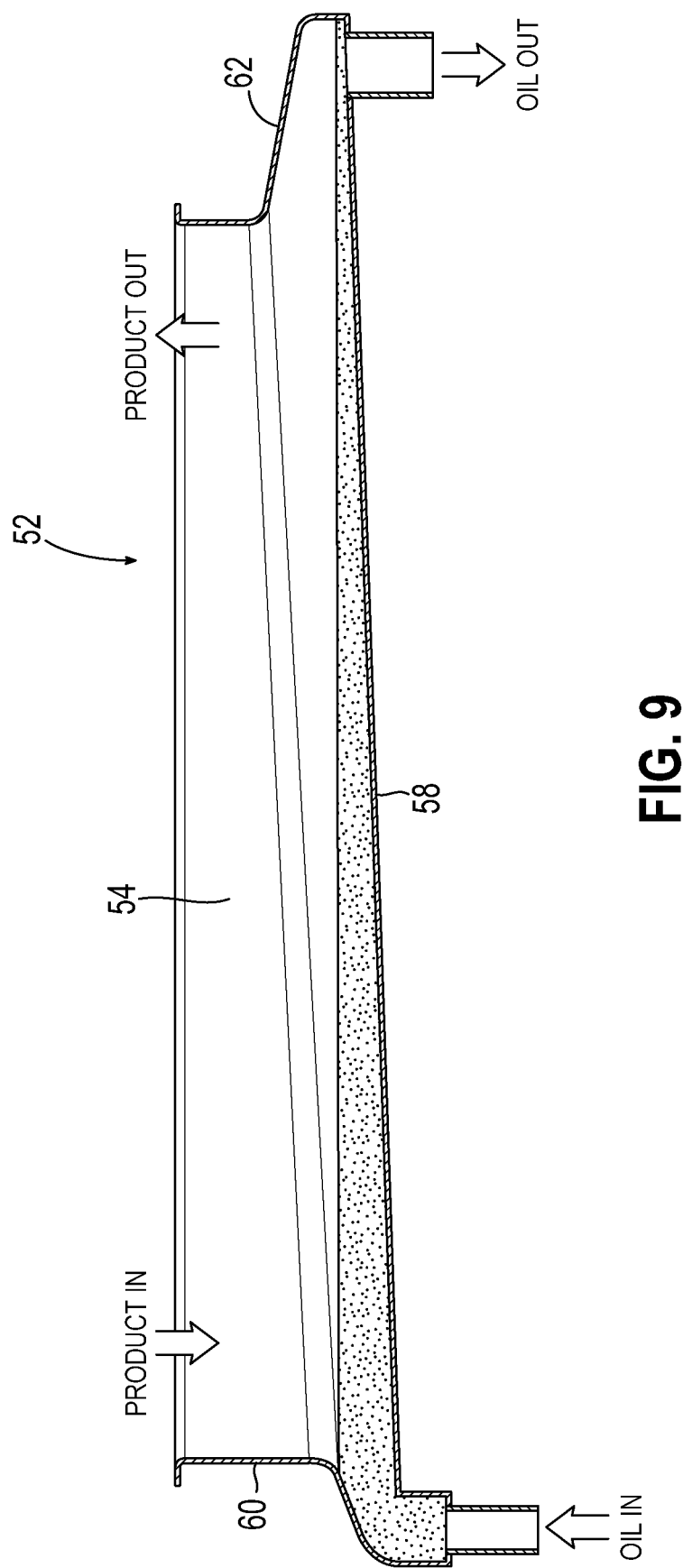
FIG. 9 is a side cross-sectional view of one of the lanes of the cooking vat in the automatic cooking system of FIG. 7.

Therefore, further embodiments of the automatic cooking system such as the cooking system 50 shown in the embodiment of FIGS. 7 through 9 have been designed with the goal of optimizing oil use to reduce overall oil consumption and to reduce or eliminate the waste factor associated with discarding oil when a top off is required to extend oil life. In this regard, a design capacity for cooking 60 to 120 pounds of French fries was set, with a goal to size the cooking vat and lane(s) such that the amount of cooking medium pulled out of the cooking vat by the food products and the cooking process (e.g., what occurs naturally as a result of frying food products) approaches the 20% top off value. In other words, the size of lanes in the cooking vat in this second embodiment has been designed to achieve 10%-20% pull off of cooking medium volume per hour of cooking operation, when 60 to 120 pounds of food products have been cooked in that hour. Thus, when the periodic top off with new cooking medium occurs, an optimized amount of top off volume can be added to the cooking vat without necessitating discharge and discarding of much (or any) waste cooking medium. These design parameters led to the conclusion that a cooking vat with four parallel lanes could handle that amount of food products per hour, and achieving the 10%-20% pull off could be done if the total retained oil volume within each lane was about 9 to 10 pounds of cooking medium. Sufficient oil depth (1.5 inches) and flow to move the food products from gate to gate is only achieved with that total oil volume when the heating elements are positioned outside the cooking vat, as described above.

The specific four-lane cooking vat of the second embodiment of the automatic cooking system is shown in FIGS. 7 through 9. Each of the 12-inch wide lanes from the first embodiment is effectively replaced by two of the lanes 52 in the cooking vat 54 shown in FIGS. 7 through 9. To this end, each lane 52 is about 6 inches wide at the top opening thereof, and the cross section of the lane 52 is modified to have chamfered corners 56 at the bottom to provide a hexagonal shape and a narrowed bottom surface 58 that is about 5 inches in width. In addition, the bottom surface 58 of the lanes 52 are angled upwardly along at least a portion of the length from an inlet end 60 of the cooking vat 54 to an outlet end 62 of the cooking vat 54, most clearly shown in FIG. 9. The bottom surface 58 is angled upwardly along an entire length of the lane 52 in the illustrated embodiment. The oil, which levels out due to gravity, is therefore deeper at the inlet end 60 to assure full food product coverage when the food products are initially placed into the cooking vat 54. The shallower depth at the outlet end 62, where the cooked food products are removed for finishing at a packaging zone (schematically indicated at 64) outside the cooking vat 54, advantageously increases oil flow velocity towards the plumbing of the oil recirculation system. These revisions to the cooking vat 54 result in oil volume of about 12.5 pounds per lane 52. This is an improvement of oil volume use (2 lanes use 25 pounds of cooking medium as compared to 35 pounds in the first embodiment) and approaches the calculated optimal value for 20% top off, which would be 9 to 10 pounds of oil volume per lane 52. Thus, the cooking vat 54 and lanes 52 in the second embodiment improve oil life span by pulling off an amount of oil volume approaching a 20% top off volume per hour of operation, while also significantly reducing the total oil volume needed within the cooking system 50.

Moreover, the flow characteristics of the cooking medium and the food products are improved thanks to the design of the lanes 52 of the cooking vat 54. The angled bottom surface 58 and the chamfered corners 56 at the bottom of the lanes 52 help avoid impeding cooking medium flow in a manner that would generate turbulence in the cooking medium that can increase oxidation of the oil (reduces oil life span) while also improving reliability of flow of food products from gate to gate 66 (one gate 66 shown in each lane 52). The generally increasing velocity of oil along the length of each lane 52 also helps assure reliable food product movement from gate to gate 66. Although not shown in these Figures, the heating elements are once again provided outside the interior of the cooking vat 54 to improve flow characteristics and avoid generation of turbulence in the cooking medium. Thus, the second embodiment of the automatic cooking system 50 provides several functional advantages, including improved oil life span, reduced oil volume use, and better flow of food products between inlet and outlet ends 60, 62 of the cooking vat 54.

As initially described above, the heating elements of the automatic cooking system 50 of this embodiment are designed to be heater rods cast in aluminum bars or blocks that are coupled to the bottom surface(s) 58 of the lanes 52 defining the cooking vat 54, to thereby provide uniform heating of the cooking medium via conduction through the cooking vat walls. Other types of conductive heaters may also be used in other embodiments consistent with the scope of this invention, such as printed heating elements with a low profile. The heating elements of any design may be positioned and configured in various manners, with some other examples of exterior mounting shown in FIGS. 10A through 10C.

Figure 10B:
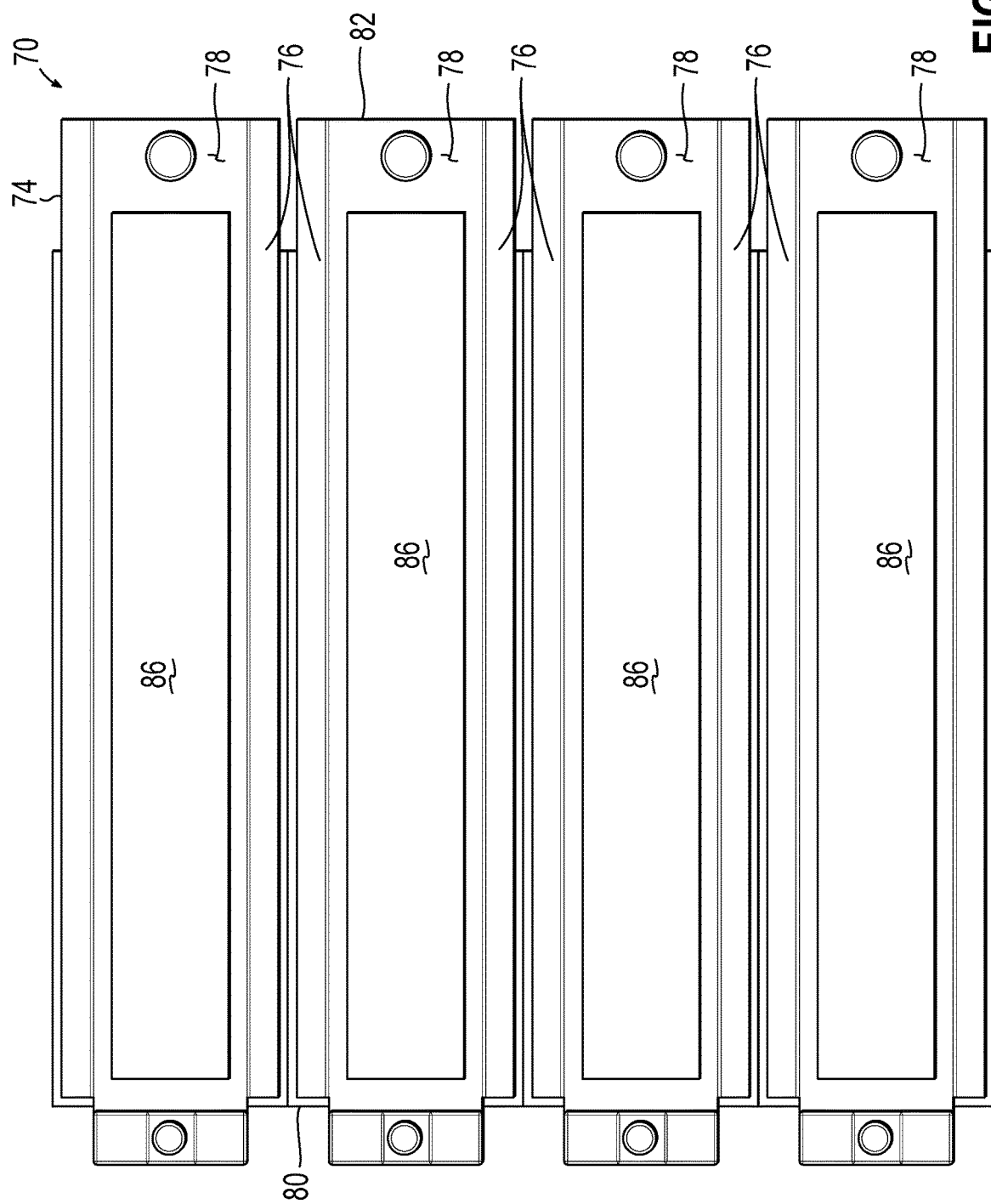
FIG. 10B is a schematic bottom view of the cooking vat of FIG. 7, with a second configuration for heating elements.

Another embodiment of the automatic cooking system 70, which is similar in overall structure to the second embodiment of FIGS. 7 through 9, is shown in FIGS. 10A and 10B with two different configurations of heating elements 72. To this end, the cooking vat 74 of this cooking system 70 includes four parallel lanes 76, and FIG. 10A shows one configuration for heating elements 72 along the bottom surfaces 78 of the cooking vat 74. Larger size heaters 72a are positioned across two or more of the lanes 76 adjacent the inlet end 80 of the cooking vat 74, while smaller size heaters 72*b* are positioned on each lane 76 individually adjacent the outlet end 82 of the cooking vat 74. The combination of larger and smaller heaters 72*a*, 72*b* collectively engages with a substantial majority of the surface area along the bottom surfaces 78 (the about 5-inch-wide surfaces) of each lane 76 of the cooking vat 74, thereby enabling the uniform heat transfer desired and needed to maintain the cooking medium at operating temperatures of 350° F. or higher. That arrangement of engagement with a large amount of surface area on the lanes 76 is maintained in each of the examples shown.

Turning to FIG. 10B, another configuration of the heating elements 86 is shown. Each lane 76 of the cooking vat 74 includes a single elongated heating element 86 connected to the about 5-inch wide bottom surface 78 thereof in this embodiment. The heating element 86 follows the angling of this bottom surface 78, as described above in connection with the second embodiment of the system. Such an embodiment may be used to individually control the lanes 76 when such individual control is desired (e.g., when fewer than the maximum number of lanes 76 may be used in operation of the cooking system 10). As will be understood, this and other embodiments of the cooking system 70 may use heating elements 86 that include rod heaters in cast blocks of aluminum, or printed heating elements, or other known designs for conducting heat into the cooking vat 74.

Figure 10C:
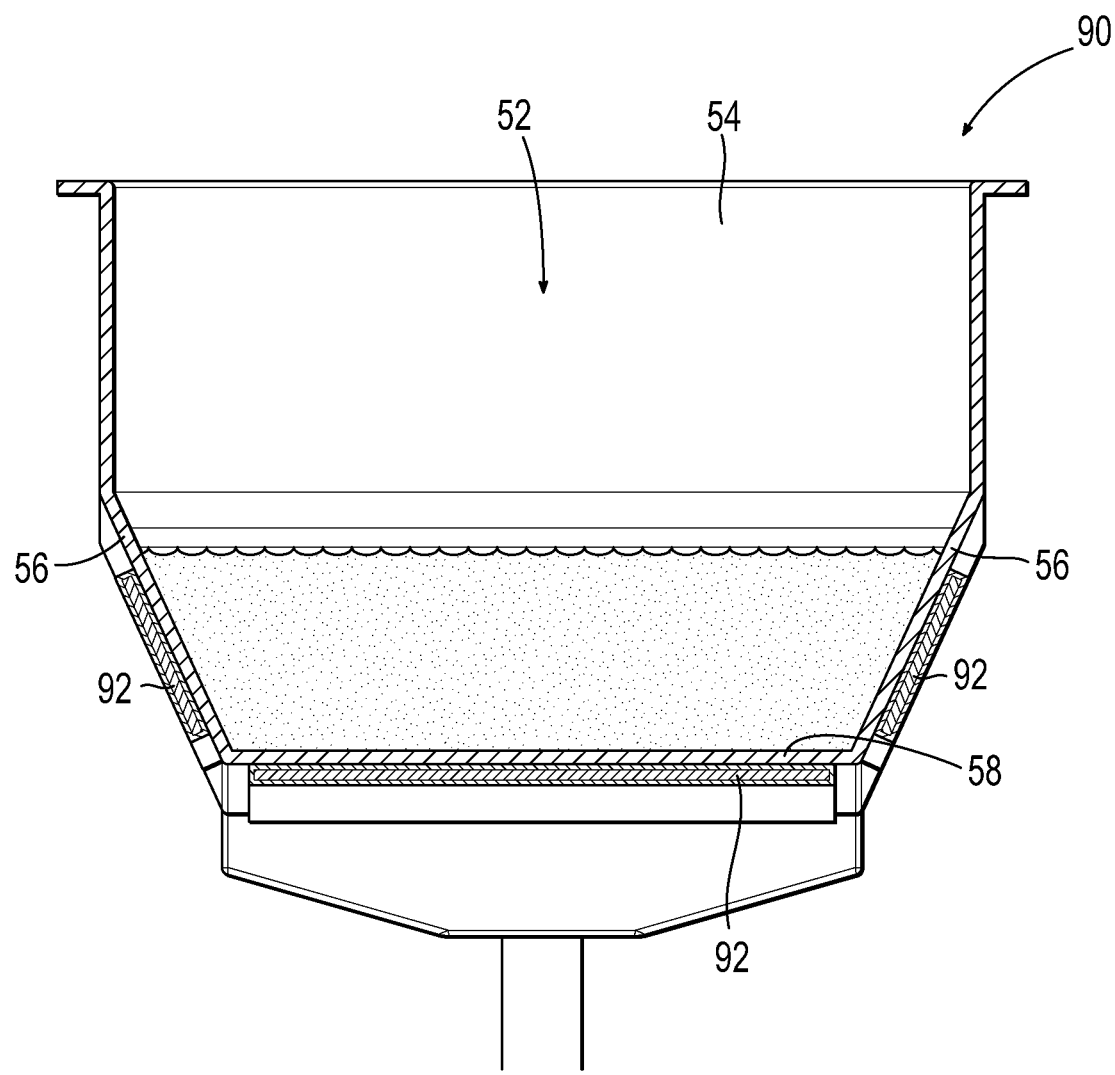
FIG. 10C is a front cross-sectional view of one of the lanes in the cooking vat of FIG. 7, showing a third configuration for heating elements.

In FIG. 10C, a further configuration is shown of a cooking system 90, which includes similar elements as one of the lanes 52 in the cooking vat 54 shown in FIGS. 7 through 9 (identical reference numbers are used where elements are unchanged from the embodiment described above). This cooking system 90 includes heating elements 92 mounted on the exterior of the cooking vat 54 along both the bottom surface 58 and the chamfered corner surfaces 56 at the bottom end of each lane 52 of the cooking vat 54. The heating elements 92 of each configuration may be coupled to the cooking vat 54 using various methods, including but not limited to, welded studs on the bottom surface 58 of each lane 52, and/or spring-loaded clamps. Regardless of the configuration and coupling mechanism chosen, the heating elements 92 provide uniform heating and temperatures within the cooking medium during cooking operations, and the heat transfer and temperature uniformity is further improved by the continuous flow of cooking medium through the cooking vat 54 and through the oil recirculation system.

Figure 11:
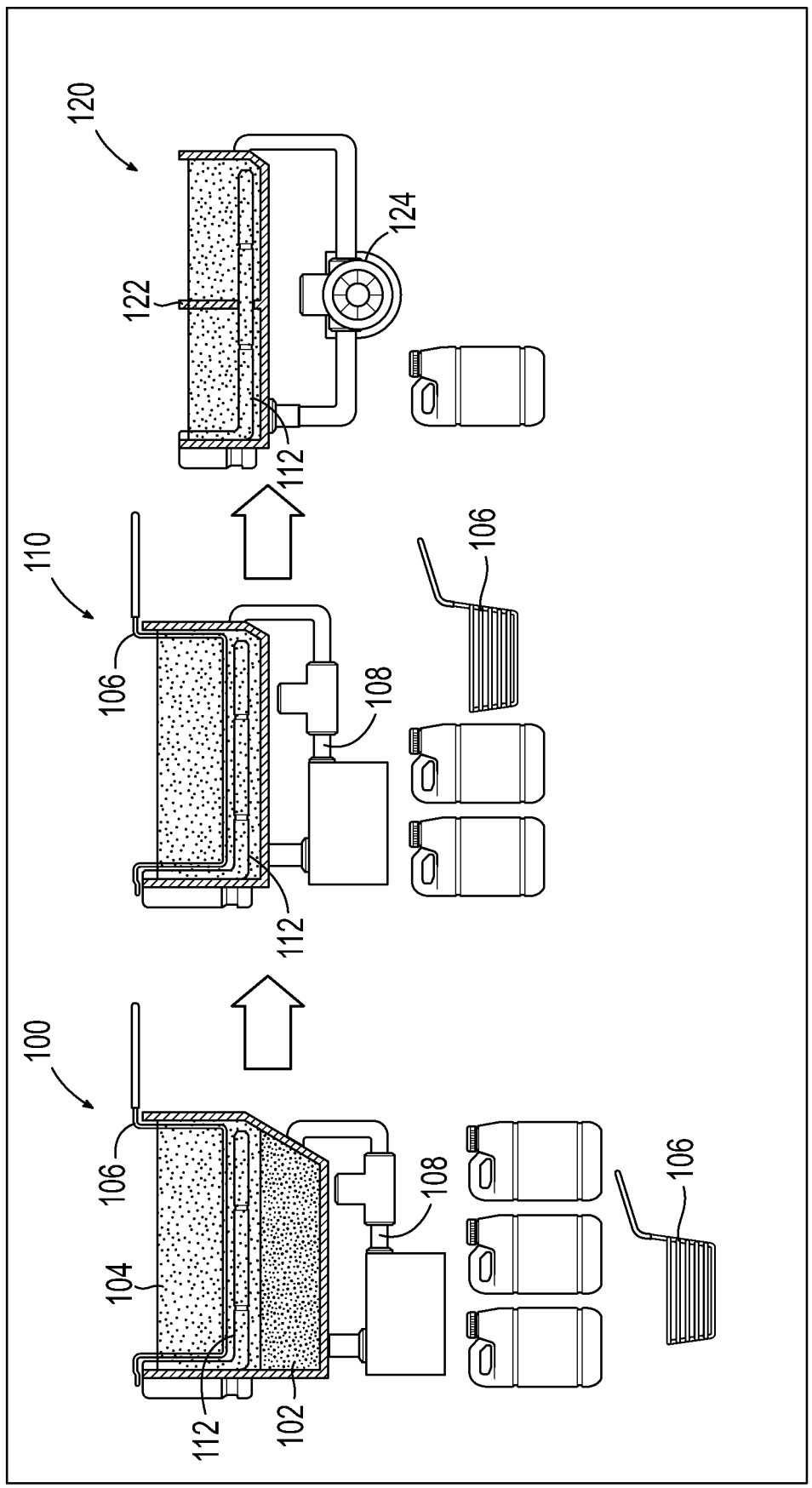
FIG. 11 is a pictorial view summarizing the history and the potential future of cooking systems such as fryers.

FIG. 11 schematically illustrates in a sequence of views the history of fryer designs and the future, based on the developments in automatic cooking systems 10, 50, 70, 90 like the ones described in the embodiments above. In FIG. 11, the left pictorial shows a conventional fryer 100 from 2007 and earlier. The fryers 100 of this era included a large volume of cooking medium, of which a portion defined a "cold zone" 102 below the operating area 104 where baskets 106 of food product would be cooked. As described above, these conventional fryers 100 required significant oil volume and use (schematically indicated by the 3 oil jugs) and manual intervention with the recirculation system 108 to conduct filtration cycles for oil life extension as well as basket movements of food products. In the middle pictorial in FIG. 11, conventional fryer designs of the last few years (e.g., from 2008 to 2016) are depicted. The large cold zone 102 of oil has been removed in such fryers 110 thanks in part to improved filtration systems, which also helps reduce oil volume use (indicated by the 2 oil jugs). The heating elements 112 are still located inside the cooking vat, however. As the use of cooking mediums such as trans-fat free oils are relatively expensive and have become desired by end consumers, the reduction of oil volume is important to achieving efficient operation of the cooking systems. Food product movement and management is still limited by the need for baskets 106 and manual intervention in such conventional designs, and filtration cycles for daily operation also typically require user intervention.

The potential future of frying technology is shown in the right pictorial of FIG. 11. This is consistent with the automatic cooking system developed in WO 2017/078939 and further refined in the embodiments of this invention. To this end, these fryers 120 include continuous filtration (by updated recirculation system 124) and automatic food product movement between cooking stations driven by cooking medium or by other driven movement devices, removing the need for manual intervention in the cooking process. One of the perforated gates 122 is also shown in FIG. 11 to show how oil can move through the fryer 120 while the food products are held in position for cooking (in embodiments where the cooking medium is used to move the food products, as set forth in several examples above). The continuous filtration and cooking vat design collectively result in a further significant reduction of oil volume use (indicated by the 1 oil jug). The improvements and advantages provided by the automatic cooking systems of this invention will help achieve the goal of minimized or optimized oil volume use, thereby improving the cost efficiency of operating such systems and performing associated cooking methods.

Figure 12A:
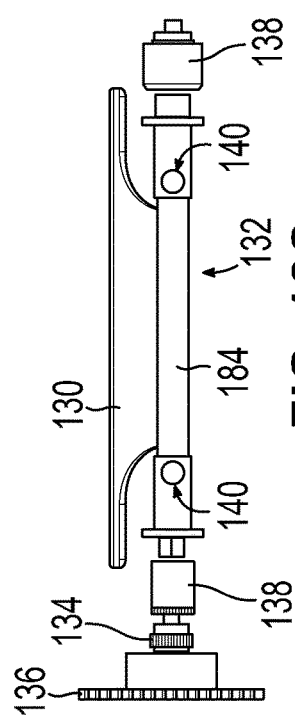
FIG. 12A is a top plan view of a rotatable gate that is used to separate different cooking sections within a cooking vat of various embodiments of the automatic cooking system of this invention, with the gate in a first position for engagement with the cooking vat.

As initially noted above, when using cooking medium to automatically drive the food product flow along lanes of a cooking vat, the batches of food product may be held in different stations or portions of the lanes with at least one gate. The gate may be configured to actuate in several manners, but one exemplary embodiment of a rotatable and/or pivotable gate 130 used with the automatic cooking systems of this invention is shown in FIGS. 12A through 18. Beginning with reference to FIGS. 12A through 13, the gate 130 is designed to be mounted by welding or the like (at joint 131) into position on a support or drive rod (hereinafter support rod 132) that releasably connects into position at the cooking vat. The support rod 132 and the gate 130 are rotatably driven by a hex drive 134 that may be gear-driven by an input gear 136 as shown in FIG. 12A, in one example. The input gear 136 may receive rotation from a motor driven by a controller of the fryer (not shown in these Figures). It will be appreciated that different types of driving units for rotating the support rod 132 and the gate 130 may be used in other embodiments without departing from the scope of the invention.

The support rod 132 extends in use between two fixed hubs 138 located on opposite sides of the cooking vat. The support rod 132 includes a spring release mechanism 140 on opposing ends that releasably engages with the two fixed hubs 138 to lock the gate 130 in position at the cooking vat, and then release the gate 130 for removal when the gate 130 or the cooking vat require cleaning. The support rod 132 also defines a rotational axis for the gate 130, which is generally horizontal in this embodiment so that the gate 130 can pivot rearwardly and upwardly away from the food product and cooking medium in the cooking vat to release flow of the food product to the next section of the cooking vat. Further details of the locking and unlocking operation of the support rod 132 and the spring release mechanism 140 are provided below with reference to pictorial views in FIGS. 16 through 18, but a cross-section showing the spring release mechanism 140 is provided at the top of FIG. 13 as well. The spring release mechanisms 140 are shown in a locked position in FIGS. 12A and 12B, and in an unlocked position ready for release and removal of the gate 130 in FIGS. 12C and 12D.

Figure 15:
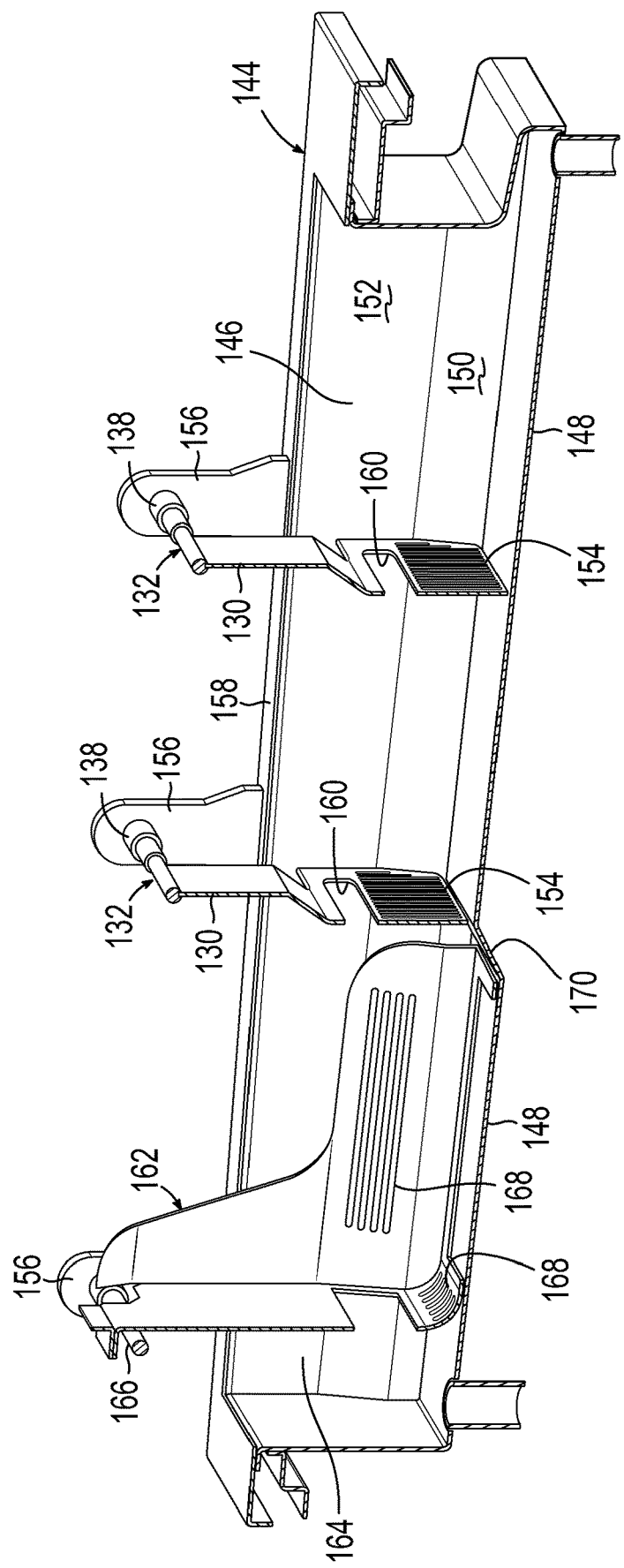
FIG. 15 is a side cross-sectional view of the cooking vat of FIG. 14 with several rotatable gates included.

FIGS. 14 and 15 illustrate several views of the gate 130 mounted in position at one embodiment of a cooking vat 144, which is largely consistent in shape and profile to the lanes/vats described above for other embodiments of the automatic cooking system. To this end, the cooking vat 144 defines an elongated lane 146 with an angled bottom surface 148 and chamfered corner surfaces 150 at the bottom of the side walls 152. The elongated lane 146 is divided into distinct cooking sections by the gates 130 (two shown in FIG. 15, but it will be understood that more or fewer gates 130 and sections may be provided in other embodiments), and a batch of food product can be held within some or all these cooking sections during operation. To move food product from one cooking section to the next, one of the gates 130 rotates rearwardly and upwardly out of the path of oil movement along the length of the lane 146, and the continuous oil flow through the cooking vat 144 then pulls the food product into the next cooking section (or the outlet end of the cooking vat 144).

As shown most clearly in FIG. 14, the gate 130 is shaped and sized to match the cross-sectional profile of the lane 146 and thereby occlude a substantial majority of the cross-section of the cooking vat 144 when in the blocking position shown, including following the side edge chamfered corner surfaces 150 at the bottom of the cooking vat 144. The gate 130 includes perforations 154 or flow apertures 154 that are large enough to permit free flow of cooking medium therethrough but small enough to occlude movement of food product into the next cooking section. The apertures 154 are designed to substantially avoid having the flowing cooking medium create turbulence and/or significant waves when the gate is pivoted through the cooking medium between a blocking position and a raised position, while also avoiding generation of significant turbulent flows in the cooking medium during use in the normal blocking or occluding position in the cooking vat 144 (when the cooking medium must flow through and around the gate 130). The pivotal movement of the gate 130 from the position shown in FIGS. 14 and 15 both opens the flow path for food product such as fries to move along the length of the cooking vat 144 while also assisting with movement of food product to avoid having the food product become stuck in a previous cooking section.

Further constructional details of this embodiment of the gate 130 at the cooking vat 144 are shown in FIGS. 14 and 15. In this regard, the fixed hubs 138 that the support rod 132 releasably couples to are provided on vertical supports 156 that extend upwardly from edges 158 of the cooking vat 144 (e.g., proximate to the side walls 152). The vertical supports 156 are configured to position the gate 130 at the appropriate occluding or blocking position when in the positions shown in FIGS. 14 and 15, while still allowing for rotation of the support rod 132 to pivot the gate 130 to an open position not shown in these Figures. The hex drive 134 and the input gear 136 may be located on an opposite side of one of the vertical supports 156 from the cooking vat 144, which can help generally isolate these drive members from cooking medium and the environment at the cooking system. The gate 130 is also shown to include a narrowed profile near the joint 131 with the support rod 132 and a large material aperture 160 above the portion of the gate 130 configured to be in the cooking medium (the portion with the flow apertures 154). These features of the gate 130 reduce the overall weight of the gate 130 to lessen the energy required to pivot between positions.

As shown in FIG. 15, an automated basket 162 may be provided near the outlet end 164 of the cooking vat 144. The automated basket 162 is typically mounted on a pivotable drive 166 in a similar manner as the support rod 132 for the gates 130. The basket 162 includes a plurality of apertures 168 to avoid blocking flow or creating significant turbulence in the cooking medium flowing along the length of lane 146. As will be readily understood from the cross-section in FIG. 15, when the leftmost gate 130 pivots upwardly and rearwardly, any batch of food product that was previously held in position at that gate 130 can be carried by oil flow into the basket 162, which defines a final cooking station within the lane 146. The bottom surface 148 of the cooking vat 144 may include a step down 170 to accommodate the bottom of the basket 162. However, the upward angling of the bottom surface 148 may still be maintained along at least a portion of the cooking vat 144 to achieve the improved flow characteristics of this invention. When a cooking cycle for a batch of food product is completed, the automated basket 162 is driven to rotate and remove the food product from the outlet end 164 of the cooking vat 144 and dump the cooked food product to a downstream prep station (an example of which was schematically illustrated and described in connection with a previous embodiment). Thus, manual intervention is avoided with the cooking vat 144 of this embodiment. The automated basket movement concept is shown in various other embodiments of this invention, including at the outlet end as shown in this and some prior embodiments, as well as along the length of the lane 146 in several alternative embodiments described in detail below.

Figure 16:
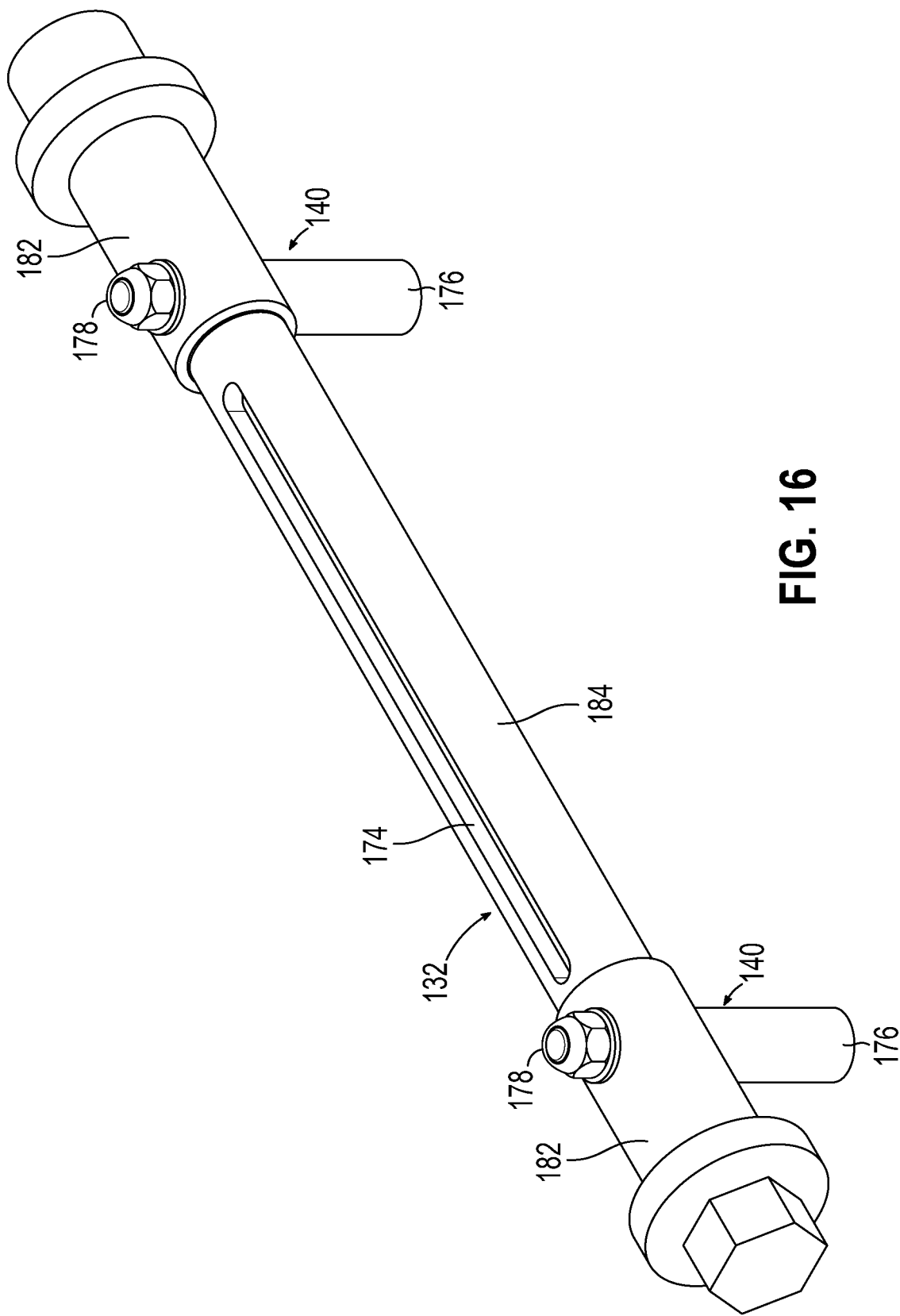
FIG. 16 is a bottom perspective view of the support rod and spring release mechanism for one of the gates of FIG. 14.
Figure 17:
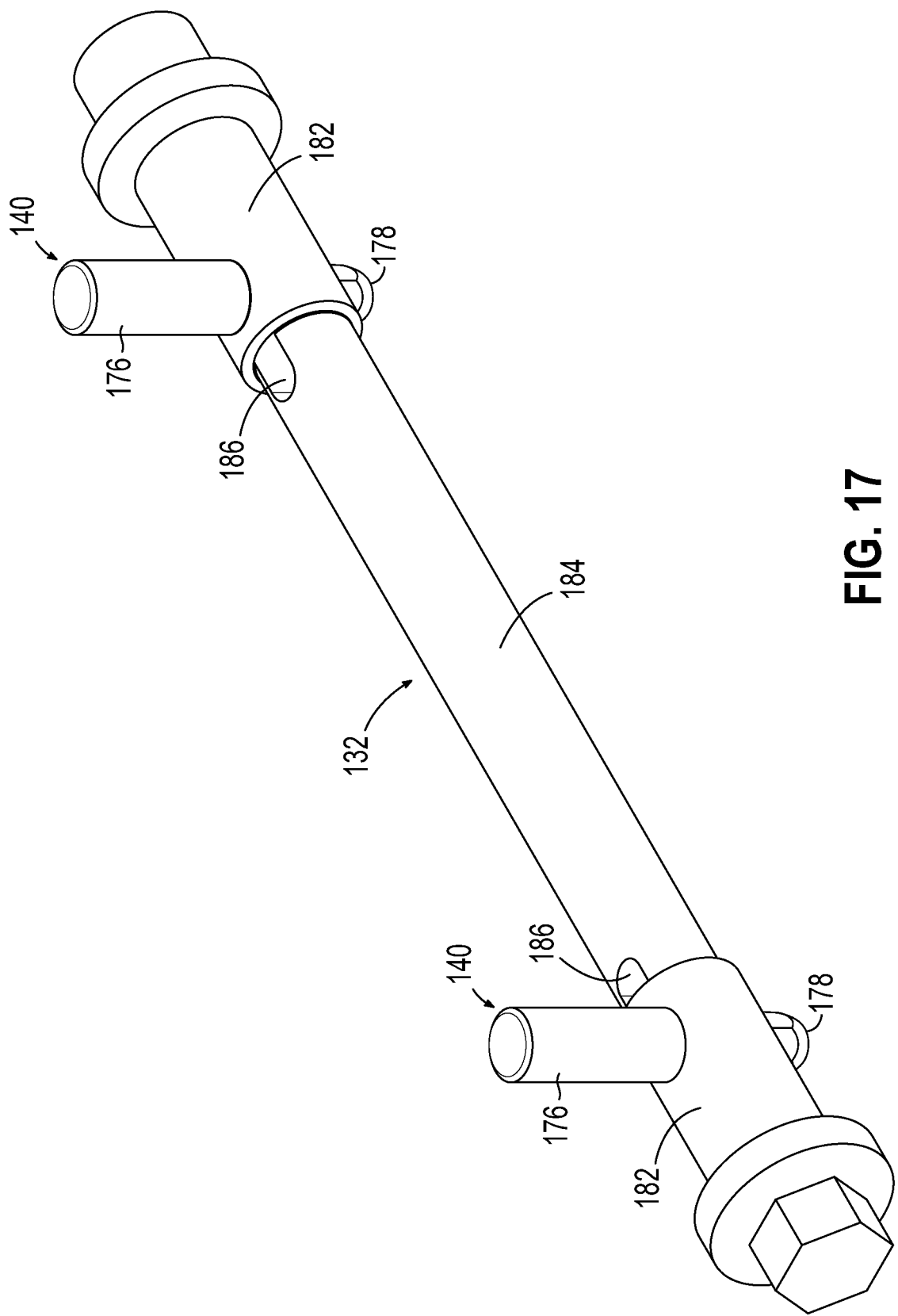
FIG. 17 is a top perspective view of the support rod of FIG. 16, with the spring release mechanism in a locked state.
Figure 18:
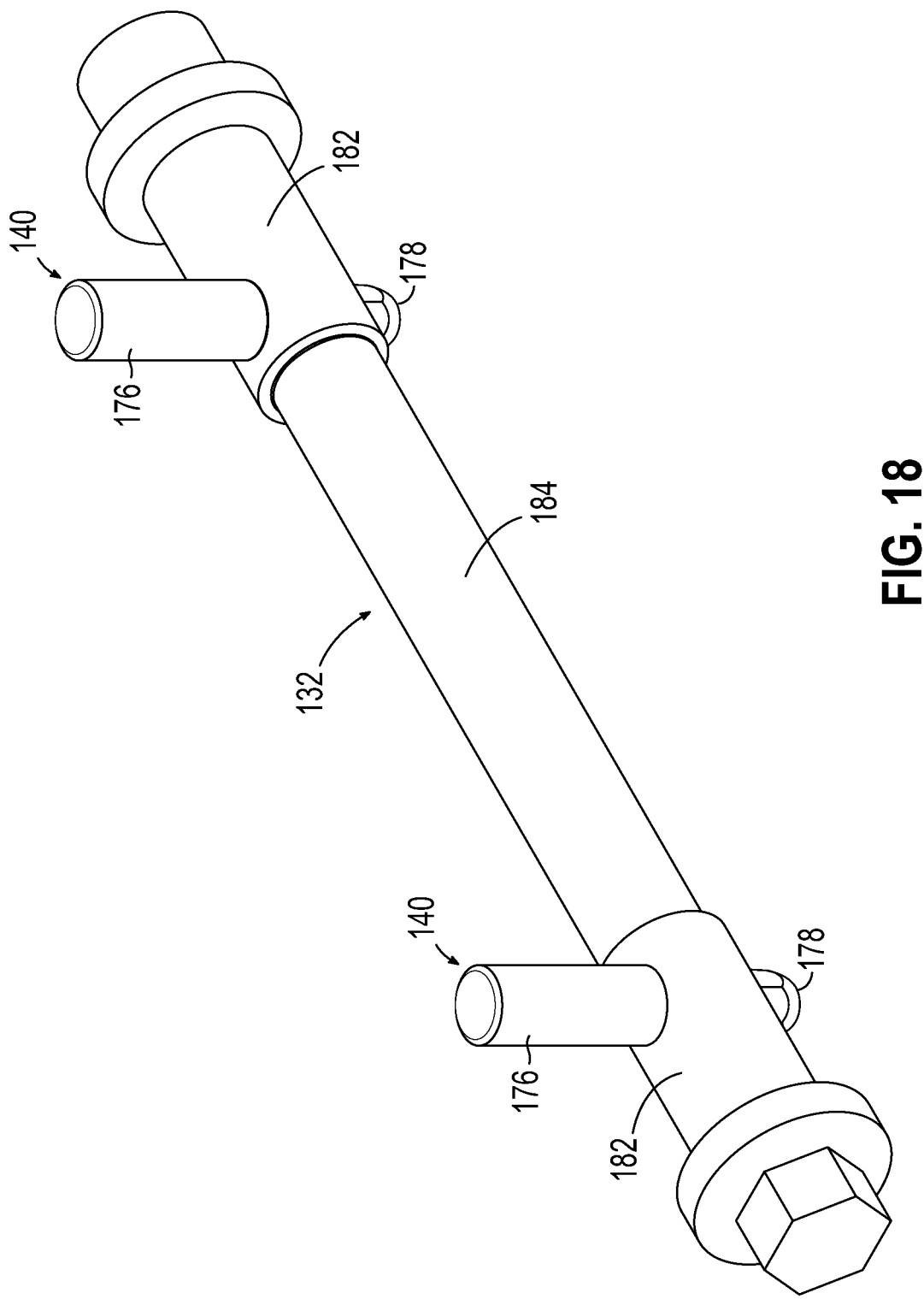
FIG. 18 is a top perspective view of the support rod of FIG. 16, with the spring release mechanism in an unlocked state.

Now turning to the pictorial views of FIGS. 16 through 18, further details of the support rod 132 for the gates 130 and the spring release mechanism 140 of this embodiment are shown. In FIG. 16, the bottom side of the support rod 132 is facing the viewer so as to reveal an elongated slot 174 in which the top end of the gate 130 is welded or otherwise secured into position to form the aforementioned joint 131 when assembling the gates 130 of this embodiment. The permanent connection of the support rod 132 to the gate 130 allows for the support rod 132 to be driven to rotate by the hex drive 134 and gear 136 described above, which then leads to movement of the gate 130 into and out of blocking positions within the cooking medium and the cooking vat 144.

Figure 12C:
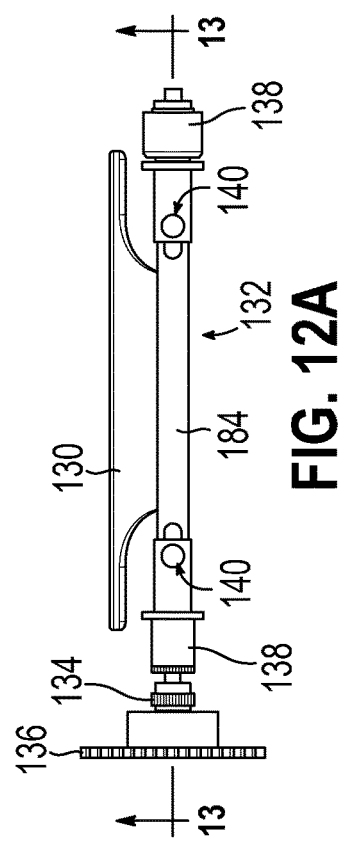
FIG. 12C is a top plan view of the rotatable gate of FIG. 12A, moved to a second position ready for disengagement with the cooking vat.
Figure 12B:
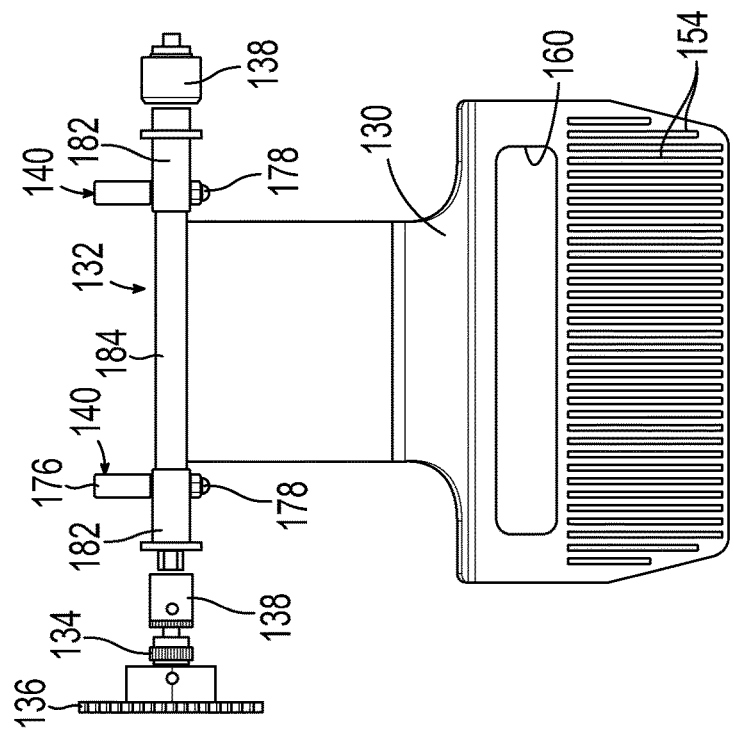
FIG. 12B is a front view of the gate of FIG. 12A in the first position.
Figure 12D:
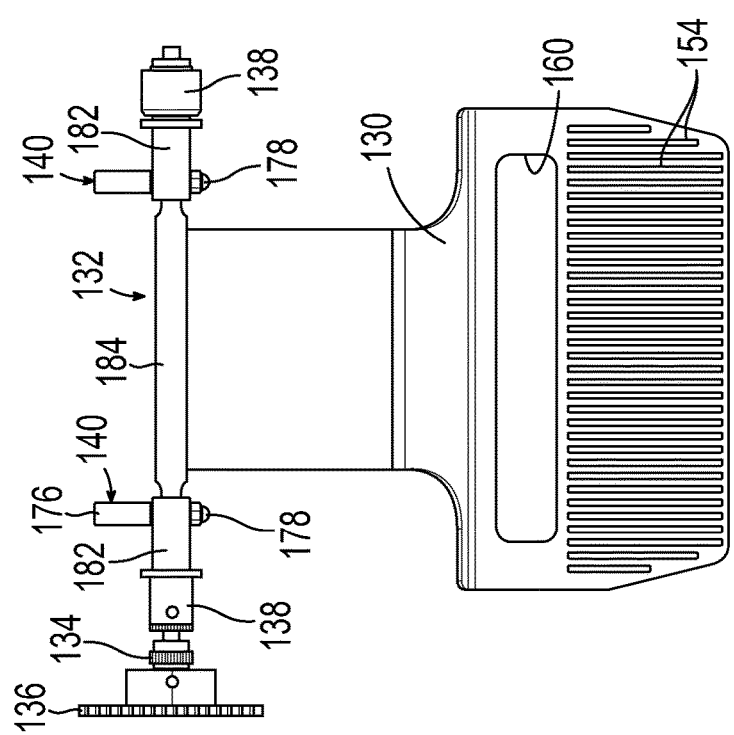
FIG. 12D is a front view of the gate of FIG. 12C in the second position.
Figure 21:
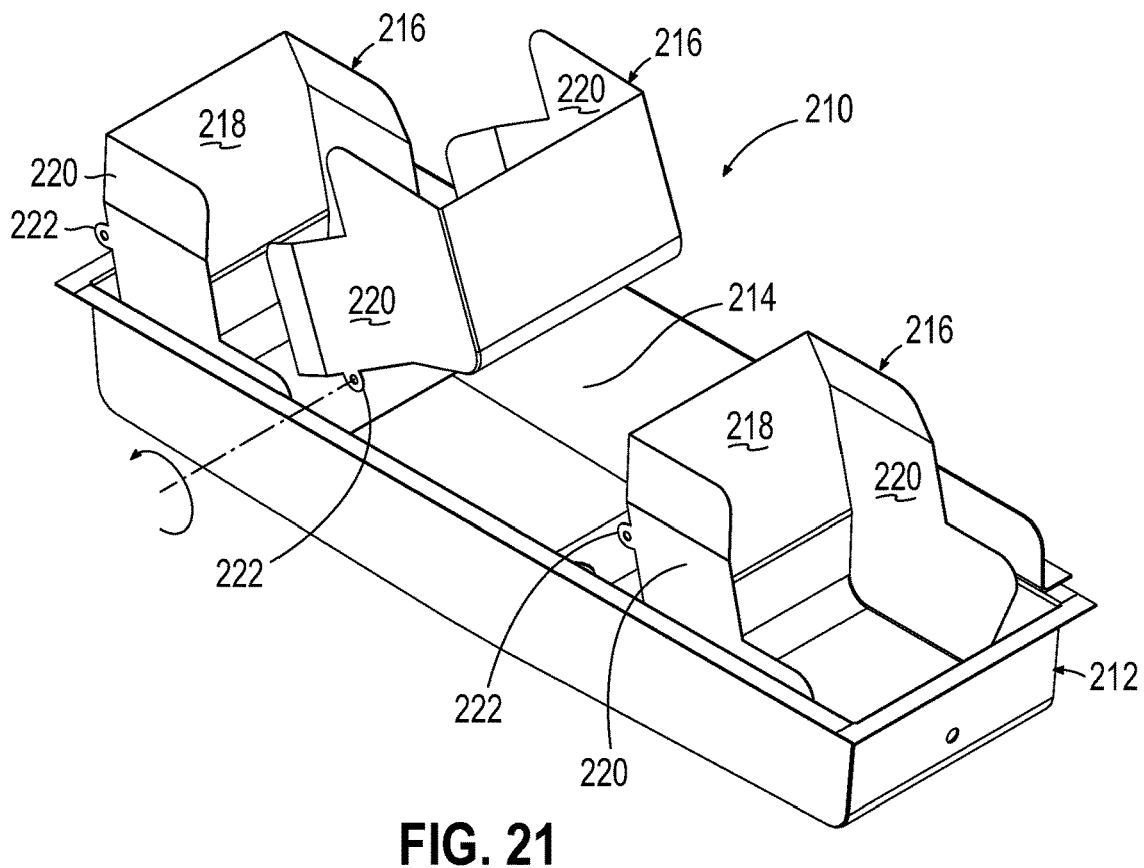
FIG. 21 is a top perspective view of the cooking system of FIG. 20, with one of the baskets rotated to dump food product into another portion of the cooking system.

In FIGS. 17 and 18, the support rod 132 is rotated from the view shown in FIG. 16 so that handles 176 on the spring release mechanism 140 can be shown (only the bottom securing nut 178 is visible for these handles in FIG. 21). Comparing FIGS. 17 and 18, the support rod 132 of FIG. 17 is in the locked position where the spring release mechanism 140 is fully extended outwardly on both opposite ends of the support rod 132, while the support rod 132 of FIG. 18 has both spring release mechanisms 140 (mounted on ends 182 of the support rod 132) pushed inwardly towards a central portion 184 of the support rod 132 and against the internal spring bias (by springs 180 that normally bias the ends of support rod 132 outwardly into the fixed hubs 138 as shown in the cross-section of FIG. 13) to reduce the effective length of this assembly. In the position in FIG. 18, the spring release mechanisms 140 can disengage the ends 182 from the fixed hubs 138 provided on opposite sides of the cooking vat 144, and this disengagement allows the support rod 132 and the gate 130 to be pulled out of the cooking vat 144 and away from the drive, such as for periodic maintenance and/or deep cleaning of the cooking vat 144 and of the gate 130. To this end, the handles 176 of the spring release mechanisms 140 are fixedly coupled to the ends 182 of support rod 132, and the central portion 184 of support rod 132 includes linear guide slots 186 in which the handles 176 can move between locked and unlocked positions. Thus, the handles 176 on the spring release mechanisms 140 can move the ends 182 of the support rod 132 inwardly along the linear guide slots 186 against the bias of the springs 180 captured between the ends 182 of the support rod 132 and the central elongate portion 184 of the support rod 132. The disengagement and small clearance formed between the fixed hubs 138 and the ends 182 of the support rod 132 is shown in FIGS. 12C and 12D, consistent with the pictorial view in FIG. 18. In the position shown in FIGS. 12A, 12B, 13 and 17, the springs 180 bias the ends 182 of the support rod 132 outwardly into engagement with the fixed hubs 138. Accordingly, the gates 130 and support rod 132 are advantageously configured for quick engagement and quick release relative to the cooking vat 144 of this and other embodiments of the invention.

By providing the rotatable gates 130 in the cooking vat 144 as shown in FIGS. 12A through 18, control of batches of food product moving through the fryer can be achieved in the automatic cooking system. As set forth above, in addition to assuring that all the food product correctly moves through the cooking vat 144 and the cooking process, this system achieves minimized oil volume use and improved flow characteristics as compared to conventional fryer designs in this field. The gates 130 also allow for easy cleaning of the cooking vat 144 and associated equipment when that cleaning or other maintenance becomes necessary. When the cooking vat 144 design is combined with the gates 130 described above and the heating elements (aluminum block heaters or printed heating elements, for example), the automatic cooking system achieves several technical effects and advantages, including improved oil life (and reduced oil volume usage) as well as more reliable food product movement through an automated fryer.

Figure 19:
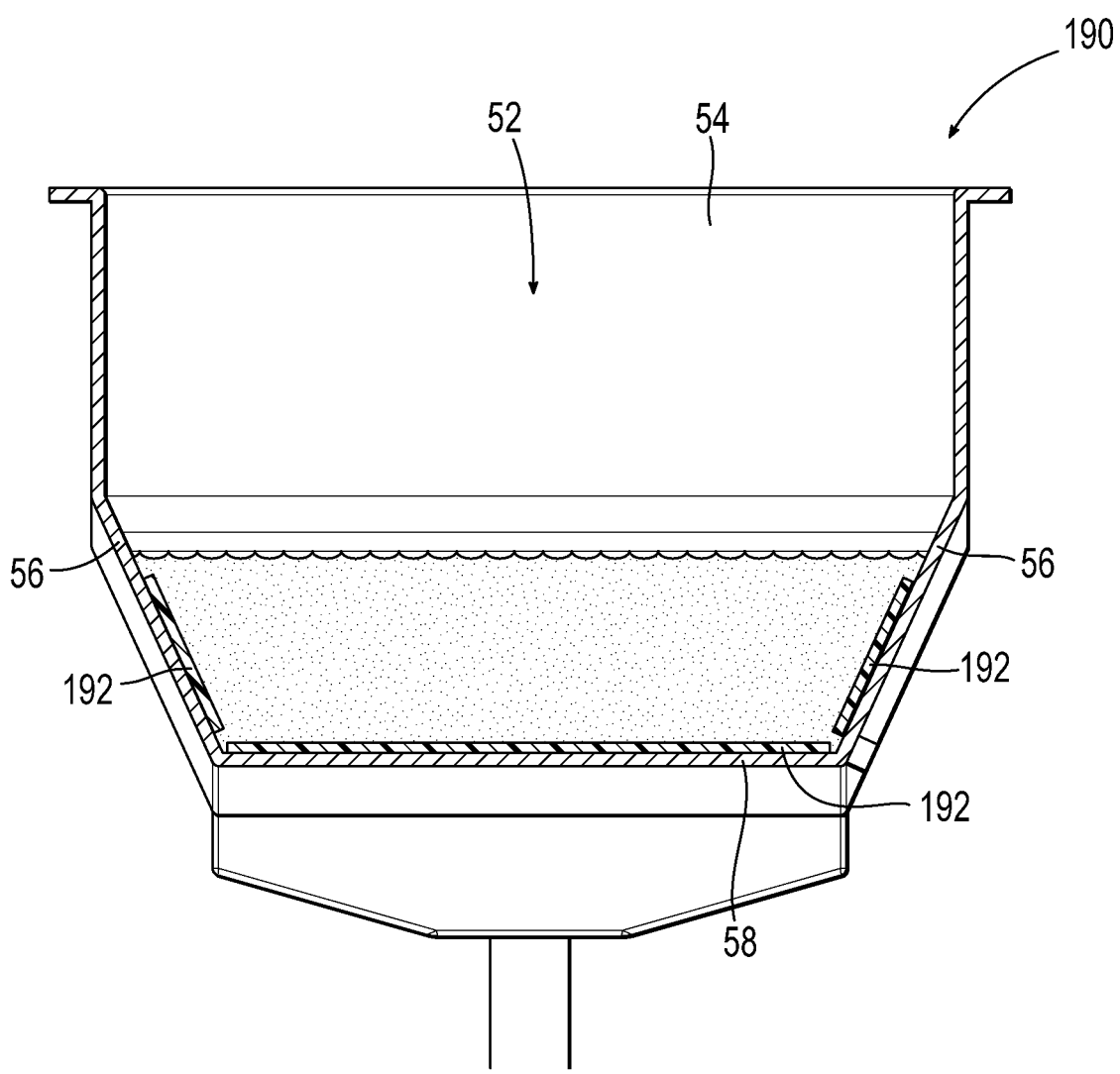
FIG. 19 is a front cross-sectional view of one of the lanes in a cooking vat of another embodiment of the invention, showing an alternative configuration for heating elements.

Now with reference to FIG. 19, an alternative embodiment of a cooking system 190 is shown. The cooking system 190 of this embodiment is highly similar to the one previously shown in FIG. 10C (system 90), and the identical elements from the prior embodiments such as the lane 52 and the cooking vat 54 are provided with the same numbers in this embodiment for the sake of brevity. The cooking system 190 of this embodiment includes low profile printed heating elements 192 located on an interior of the cooking vat 54, specifically along the bottom surface 58 and the chamfered corner surfaces 56. The printed heating elements 192 do not provide significant flow restriction to the cooking oil flowing in the lane 52, so additional turbulence and oxidation that can lower the lifespan of the cooking oil is avoided in such an arrangement. It will be appreciated that internal or external heating elements of the types described herein may be combined in any combination (including with internal and external heating mixed together, for example) with the various embodiments of the automatic cooking system, without departing from the scope of the invention because these heating elements in all embodiments achieve uniform heating of the cooking medium without adding significant flow restrictions. In embodiments where the cooking medium continuously flows, as in most of the prior embodiments described herein, the steady flow of the cooking medium also helps achieve the uniform heating within the cooking medium.

Several alternative embodiments of automatic cooking systems are shown with reference to FIGS. 20 through 32. The inventors of the present invention have discovered that while a continuously flowing cooking medium can provide several advantages in the automatic cooking system context, it may also be desirable to move the food product from station to station within a cooking lane using other mechanisms (such as by so-called dividing and movement devices). Such alternative embodiments do not necessarily require the same recirculation system and continuous filtration as in prior embodiments, which can help save on complexity and cost of the design. However, these alternative embodiments continue to achieve reliable food product movement through a fryer and cooking process, without necessitating manual intervention as in conventional fryer designs.

Figure 20:
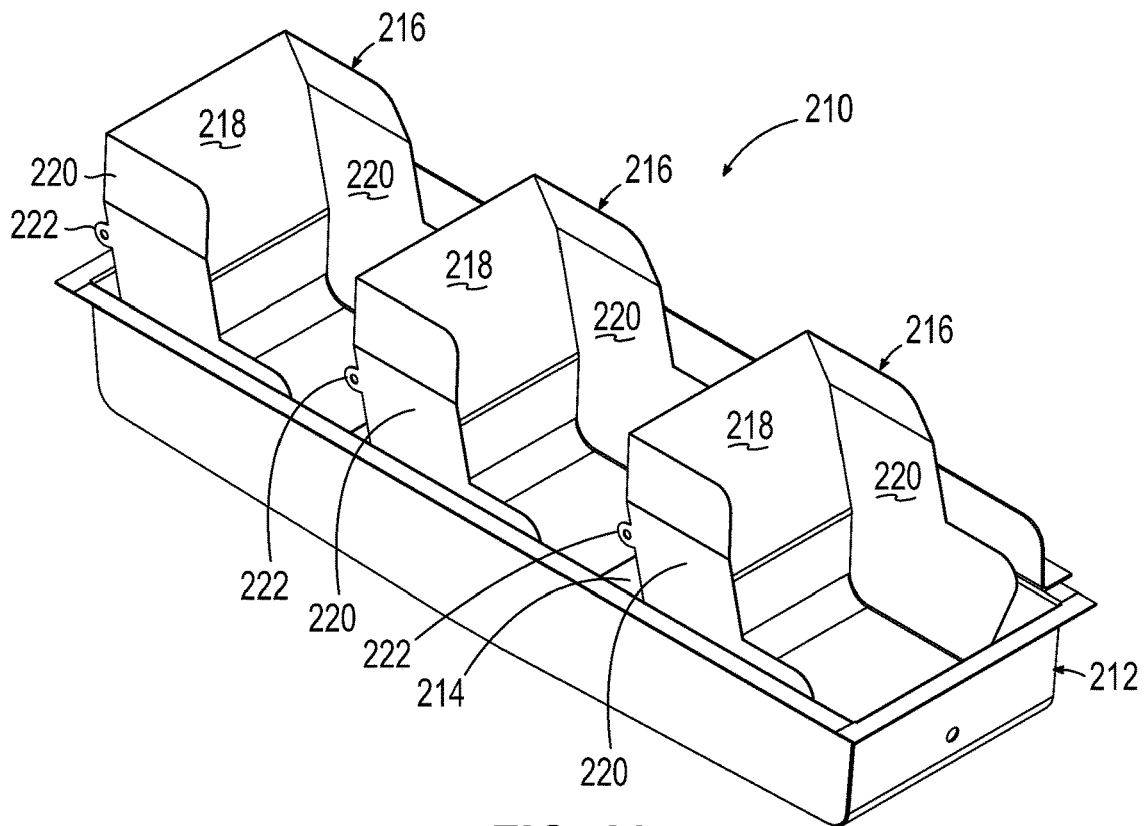
FIG. 20 is a top perspective view of another embodiment of an automatic cooking system of the invention, including a series of rotatable baskets in the cooking vat.

With reference first to the embodiment shown in FIGS. 20 and 21, an automatic cooking system 210 includes a cooking vat 212 defining a lane 214 that is elongated for food product to move along during a cooking cycle. The dividing and movement devices in this cooking system 210 are defined by a plurality of baskets 216 oriented in a sequential row along the length of the lane 214. Each of the baskets 216 defines a generally L-shaped configuration and includes a rear wall 218 which extends upwardly out of the cooking oil and is configured to hold food product in a corresponding portion of the cooking vat 212. These portions may also be referred to as cooking stations in this specification. The rear wall 218 and adjacent portions of sidewalls 220 defining the basket 216 collectively provide a chute-like structure for guiding food product that is automatically dumped out of the basket 216 when movement to another cooking station or out of the cooking system 210 is required. To this end, each basket 216 typically holds the food product for a controlled set period of time, and then rotates to dump the food product into the next basket 216 in sequence. The final basket 216 in the sequence at the outlet end of the cooking vat 212 dumps fully cooked food product to a holding and packaging station (not shown), as in other embodiments.

Each of the baskets 216 defining the dividing and movement devices in this embodiment are pivotally coupled to the cooking vat 212. This pivotal coupling may be removable as with the coupling of the gates in the prior embodiments. The baskets 216 are connected to a drive that can selectively rotate the baskets 216 between the base cooking position shown in FIG. 20 and the dump position shown by the middle basket 216 in the view of FIG. 21. As can be seen in FIG. 21, the aforementioned height of the rear wall 218 and the sidewalls 220 forms a chute that accurately delivers all of the food product in the basket 216 into the next basket 216. The drive is controlled by a main controller of the cooking system 210 in a typical embodiment. The pivotal coupling joints 222 of the baskets 216 and the corresponding axes of rotation for pivoting the baskets 216 are shown to be located above a top of the cooking vat 212, and it will be understood that vertical supports like the ones shown in FIG. 20 may be provided to support the baskets 216 in this manner. It will further be understood that while the baskets 216 are shown schematically as solid-wall pieces in these Figures, the baskets 216 are typically provided with a plurality of apertures or perforations that allow oil movement and draining during the pivot movement but block the undesired movement of food products between cooking stations. The cooking system 210 of this embodiment avoids manual intervention in managing food product movement during frying, and thereby improves the functionality and reliability of automatic cooking systems.

Figure 22:
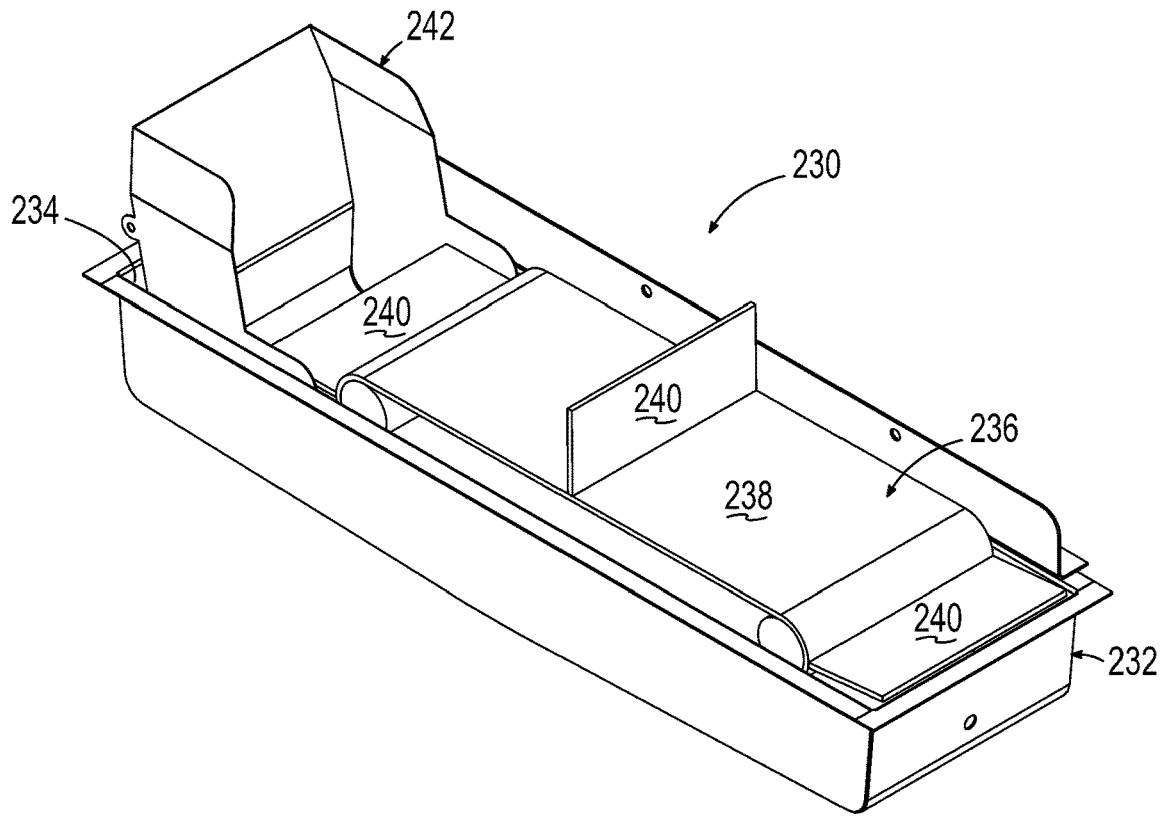
FIG. 22 is a top perspective view of yet another embodiment of an automatic cooking system of the invention, including a conveyor for moving food product in the cooking vat.
Figure 23:
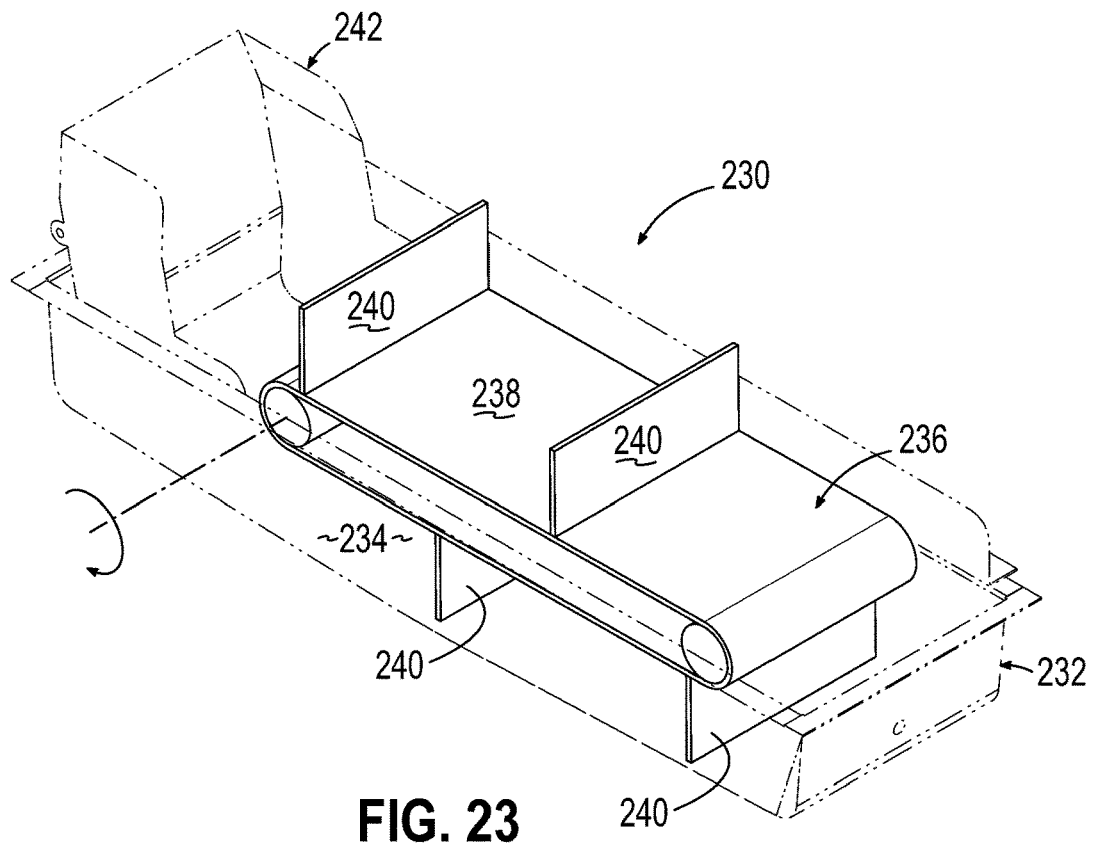
FIG. 23 is a top perspective view of the conveyor of FIG. 22.
Figure 24:
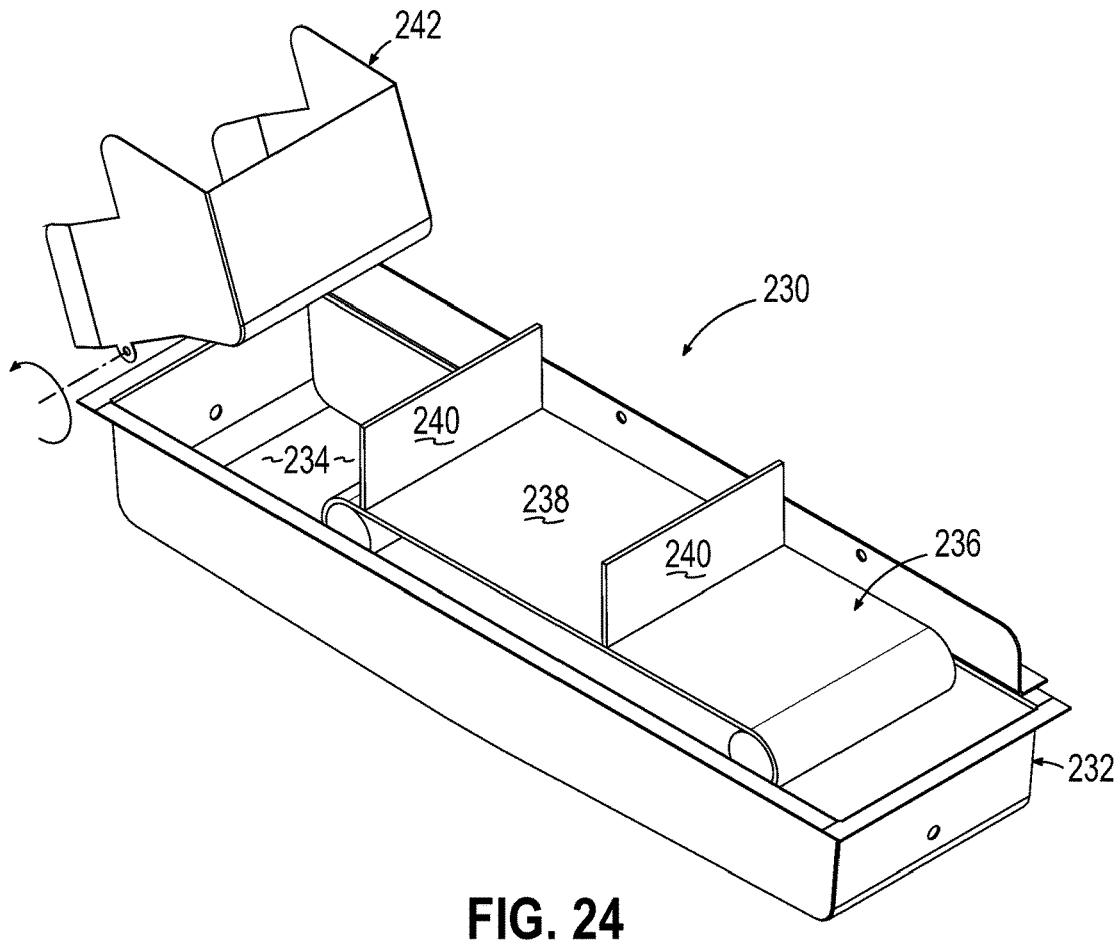
FIG. 24 is a top perspective view of the cooking system of FIG. 22, with the conveyor and an outlet basket moved to different positions.

With reference to a further embodiment shown in FIGS. 22 through 24, an automatic cooking system 230 includes a cooking vat 232 defining a lane 234 that is elongated for food product to move along during a cooking cycle. The dividing and movement device in this cooking system 230 is defined by a conveyor 236 that extends generally linearly along a majority of the length of the lane 234. The conveyor 236 includes a rotating belt 238 and a plurality of dividing paddles 240 extending transversely from the belt 238. These elements of the conveyor 236 can be best viewed in FIG. 23, where the cooking vat 232 is shown in phantom only. The paddles 240 define spaces therebetween which form cooking sections that move as the belt 238 rotates through the lane 234. The paddles 240 are equally spaced along the belt 238 so that the sections for receiving batches of food product are substantially identical in size. The conveyor 236 can be controlled by a controller of the cooking system 230 to move continuously (relatively slow speed) or in set amounts at certain times after the food products have cooked at their current cooking stations for the desired amount of time. The conveyor 236 is positioned to help assure the food product is submerged in cooking medium as the food product moves through the lane 234 in the cooking process, and the top side of the conveyor 236 is typically positioned above the level of the cooking medium. However, the particular positioning of the conveyor 236 may be modified in other embodiments consistent with the scope of the invention. The conveyor 236 assures reliable movement of batches of food product through the cooking system 230 in a similar manner as the basket-based and oil-based movement embodiments described above.

The cooking system 230 of FIGS. 22 through 24 also includes an outlet basket 242 located near an outlet end of the cooking vat 232 and at a terminal end of the conveyor 236. The outlet basket 242 is pivotally coupled to the cooking vat 232 so that a fully cooked batch of food product can be removed from the lane 234 in a substantially identical fashion as described above with reference to the FIGS. 20 and 21 embodiment. To this end, the outlet basket 242 dumps fully cooked food product to a holding and packaging station (not shown), as in other embodiments. The conveyor 236 is positioned relative to the outlet basket 242 to positively force all of a batch of cooked food product into the outlet basket 242 before rotating out of the path of the basket 242 such that it can rotate to dump the food product as shown in the progression of FIGS. 23 and 24. Likewise, the conveyor 236 is spaced from the inlet end of the cooking vat 232 to allow for access of food batches into the fryer before the paddle 240 moves to submerge and force the batch of food product to move through the lane 234 during the cooking process.

It will further be understood that while the conveyor 236 and its paddles 240 are shown schematically as solid-wall pieces in these Figures, these elements may be provided with a plurality of apertures or perforations that allow oil movement and draining during the movement but block the undesired movement of food products between cooking stations. The cooking system 230 of this embodiment avoids manual intervention in managing food product movement during frying, and thereby improves the functionality and reliability of automatic cooking systems.

Turning now with reference to another embodiment shown in FIGS. 25 through 29, an automatic cooking system 250 includes a cooking vat 252 defining a lane 254 that is elongated for food product to move along during a cooking cycle. The dividing and movement device in this cooking system 250 is defined by one or more flexible gates 256 (two shown in the Figures) that are positioned in a sequence along the length of the lane 254. Each of the gates 256 defines a generally angled or L-shaped configuration and is configured to hold food product in a corresponding portion of the cooking vat 252, e.g., cooking stations. The gates 256 are either formed from a slightly flexible material or are mounted in a spring-loaded manner such that when the gates 256 rotate, they run over and contact the entire surface of the interior of the cooking vat 252 at that corresponding portion or cooking station. To this end, each gate 256 typically holds the food product for a controlled set period of time, and then rotates to move the food product into the next cooking station, and the flexibility of the gates 256 assures that all of the food product in the batch is reliably moved to the next station. The gates 256 may also then be configured to flexibly rotate past one another even when their areas of rotation slightly overlap, which is typical in this embodiment. Alternatively, the gates 256 can be formed with interlacing fingers to allow for the rotation past one another in the overlapping area.

Figure 25:
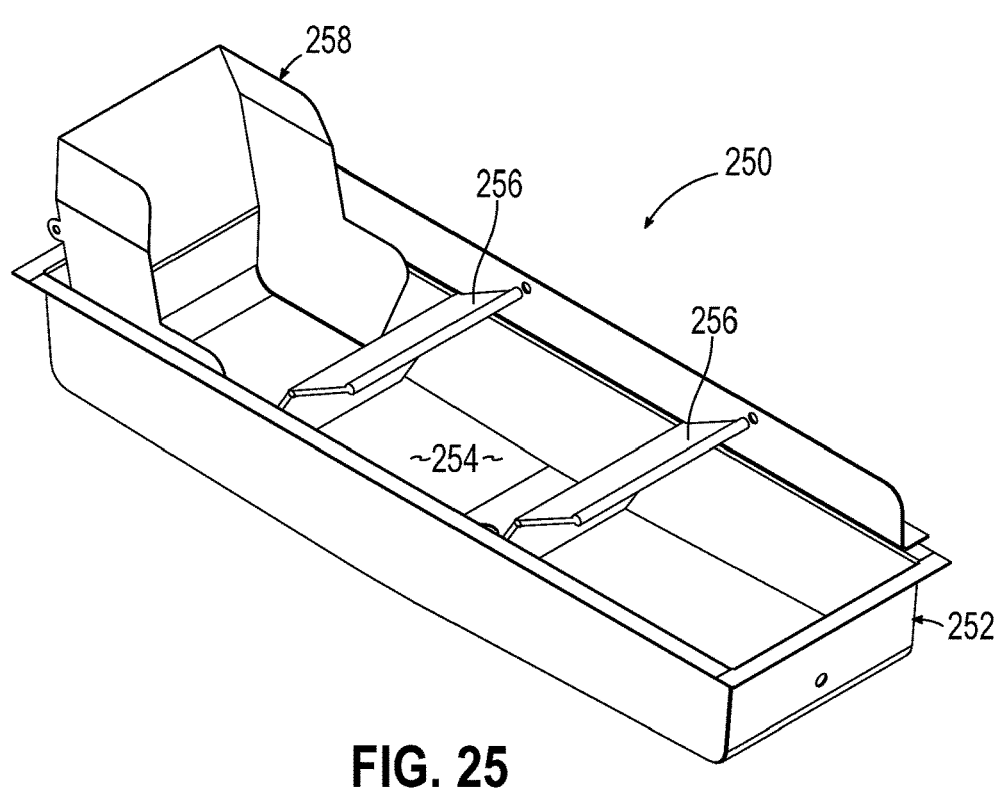
FIG. 25 is a top perspective view of a further embodiment of an automatic cooking system of the invention, including a series of flexible or spring-loaded gates for moving food product in the cooking vat.
Figure 26:
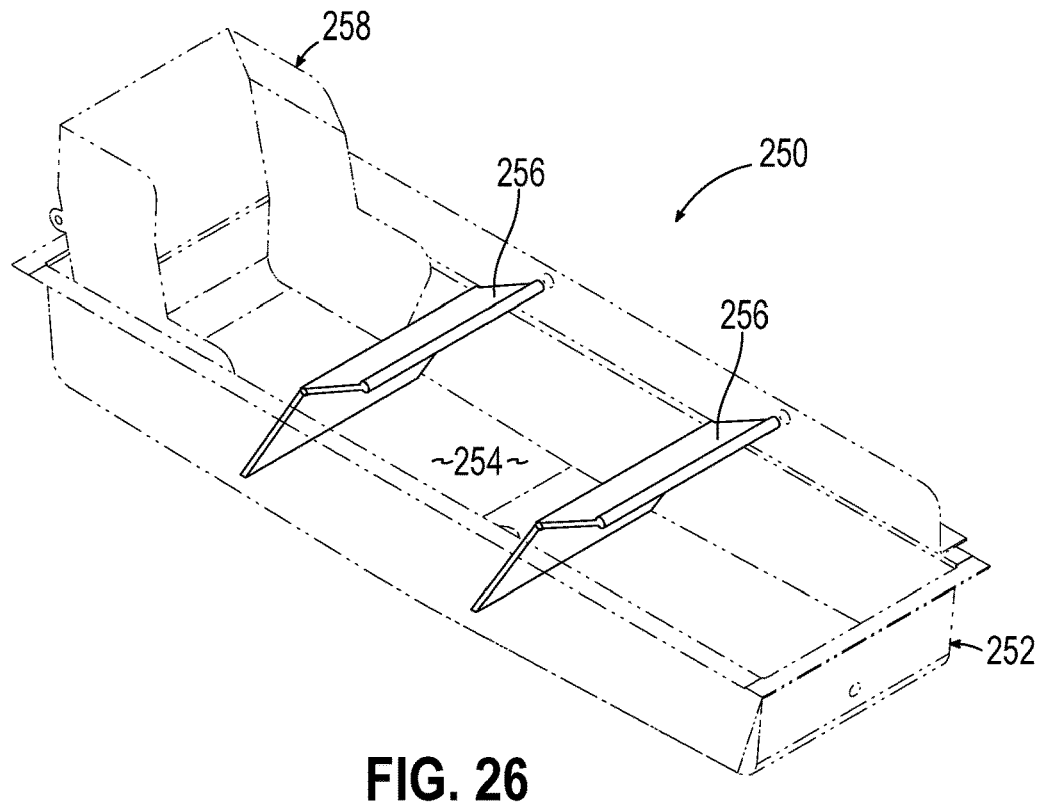
FIG. 26 is a top perspective view of the flexible gates of FIG. 25.
Figure 27:
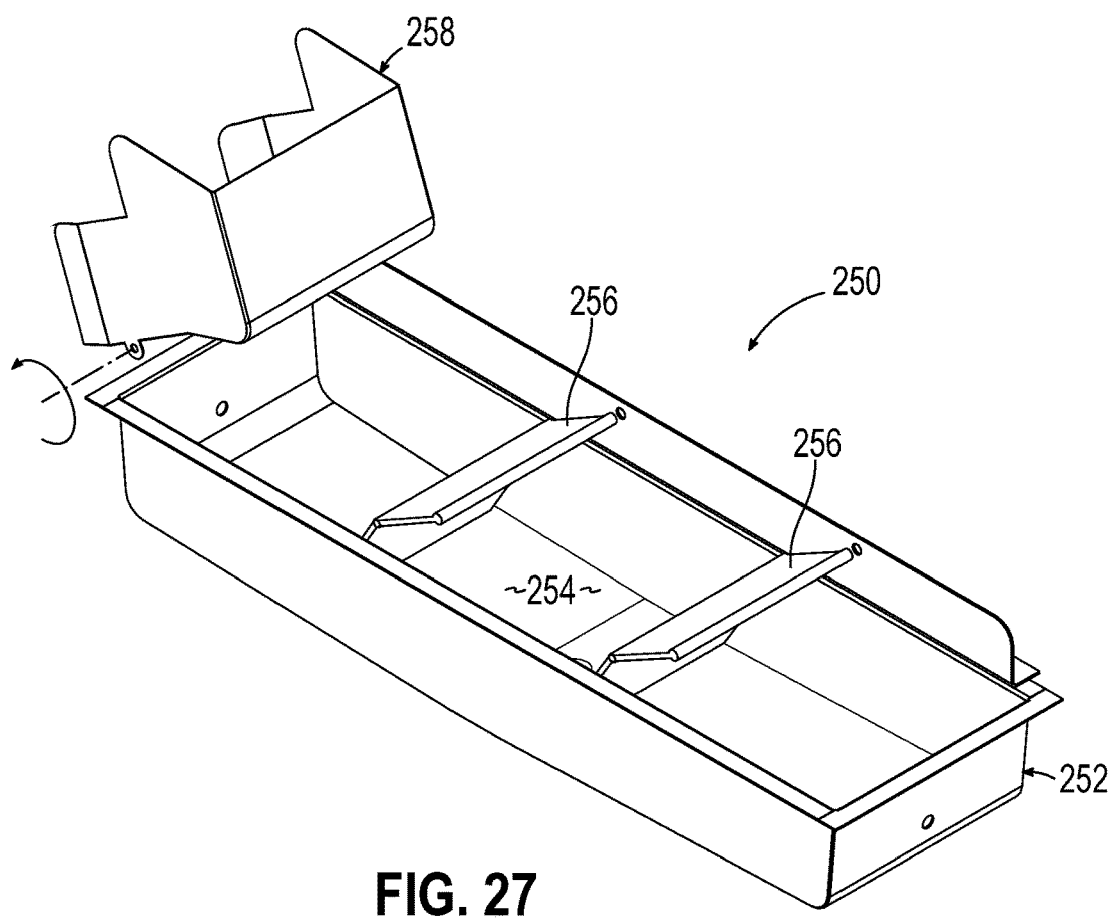
FIG. 27 is a top perspective view of the cooking system of FIG. 25, with an outlet basket moved to a different position.
Figure 28:
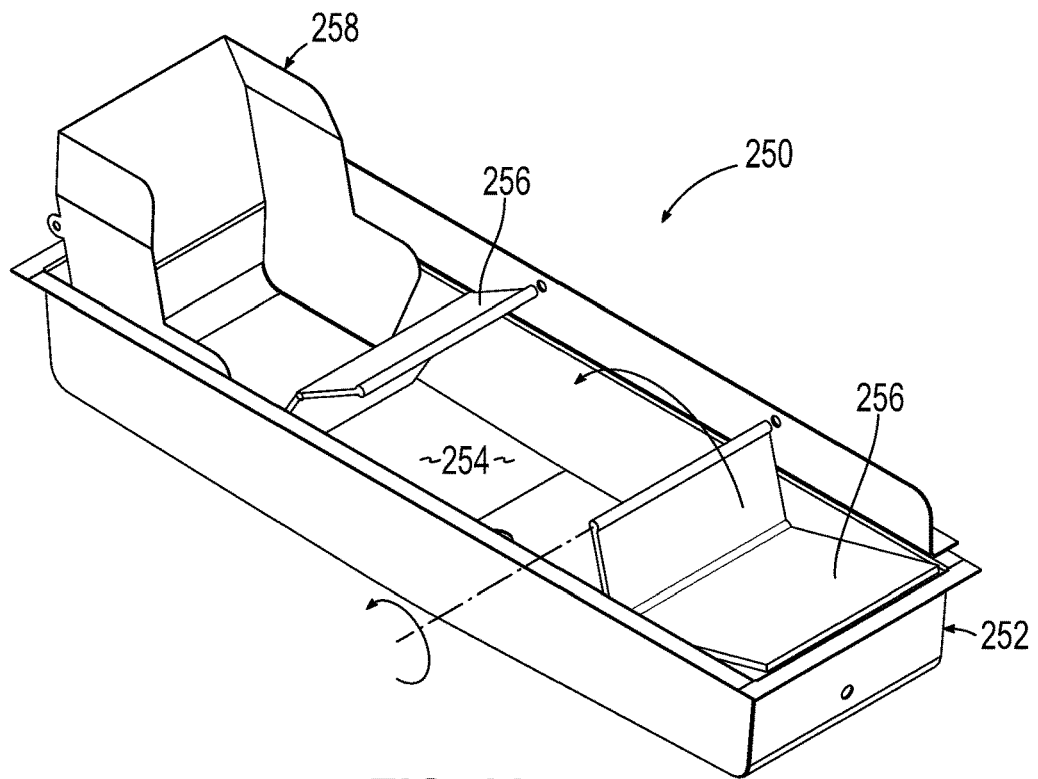
FIG. 28 is a top perspective view of the cooking system of FIG. 25, with a first of the flexible gates moved to a different position.
Figure 29:
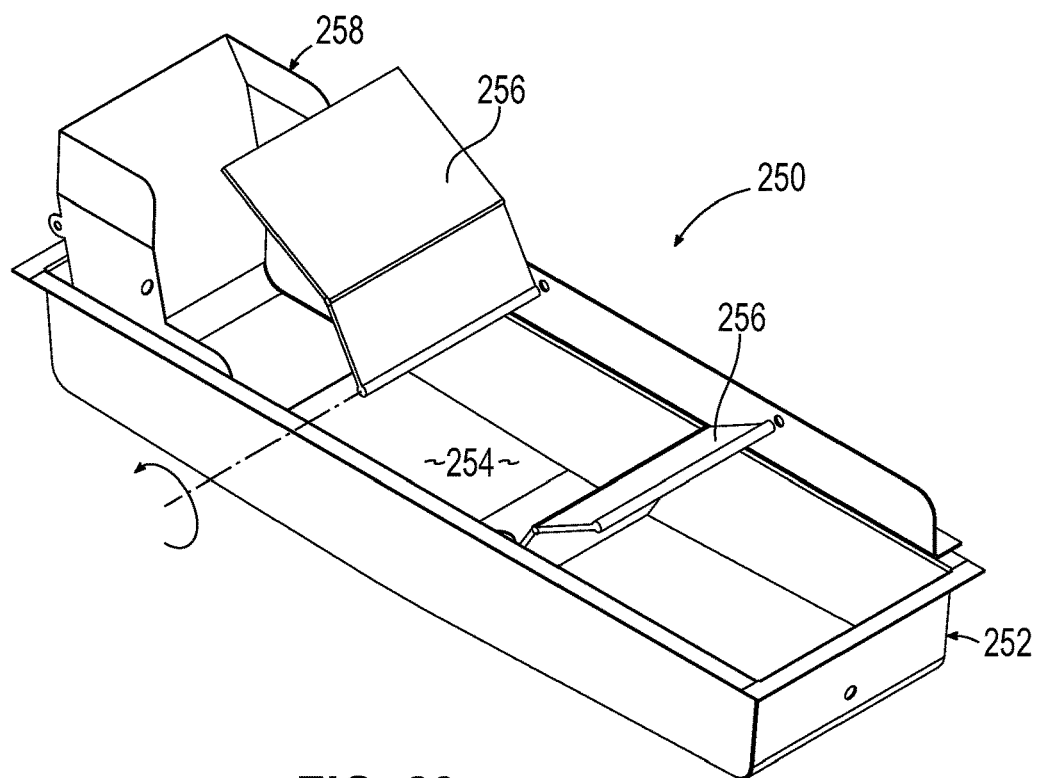
FIG. 29 is a top perspective view of the cooking system of FIG. 25, with a second of the flexible gates moved to a different position.

FIG. 25 illustrates a base position of the cooking system 250 in which the gates 256 hold batches of food product within corresponding cooking stations along the length of the lane 254. FIG. 26 shows the cooking vat 252 in phantom to better illustrate the shape and positioning of the gates 256 in this base position. FIG. 28 shows the rightmost of the gates 256 rotated and it can be seen that the flexible nature of the gate 256 allows for the entire batch of food product to be picked up and moved into the next cooking station when the gate 256 rotates. Likewise, FIG. 29 shows the end of a rotation of the leftmost of the gates 256 which is when a batch of food product would be dumped into an outlet basket 258 at the outlet end of the cooking vat 252. The outlet basket 258 is pivotally coupled to the cooking vat 252 so that a fully cooked batch of food product can be removed from the lane 254 in a substantially identical fashion as described above with reference to the FIGS. 20-21 and 22-24 embodiments. To this end, the outlet basket 258 dumps fully cooked food product to a holding and packaging station (not shown), as in other embodiments. The gate(s) 256 are positioned relative to the outlet basket 258 to positively force all of a batch of cooked food product into the outlet basket 258 before rotating out of the path of the basket 258 such that it can rotate to dump the food product as shown in FIG. 27, for example.

Each of the gates 256 defining the dividing and movement devices in this embodiment are pivotally coupled to the cooking vat 252. This pivotal coupling may be removable as with the coupling of the baskets in the prior embodiments. The gates 256 are connected to a drive that can selectively rotate the gates 256 between the positions shown in FIGS. 25 through 29 and described above. The drive is controlled by a main controller of the cooking system 250 in a typical embodiment. The pivotal coupling joints (not shown) of the gates 256 and the corresponding axes of rotation for pivoting the gates 256 are located above a top of the cooking vat 252, and it will be understood that vertical supports like the ones shown in FIG. 20 may be provided to support the gates 256 in this manner. It will further be understood that while the gates 256 are shown schematically as solid-wall pieces in these Figures, the gates 256 are typically provided with a plurality of apertures or perforations that allow oil movement and draining during the pivot movement but block the undesired movement of food products between cooking stations. Furthermore, while rotation in one direction is shown in the Figures to move the gates 256, rotation in an opposite direction may be used in other embodiments to move the batches of food product without departing from the scope of the invention. The cooking system 250 of this embodiment avoids manual intervention in managing food product movement during frying, and thereby improves the functionality and reliability of automatic cooking systems.

Figure 30:
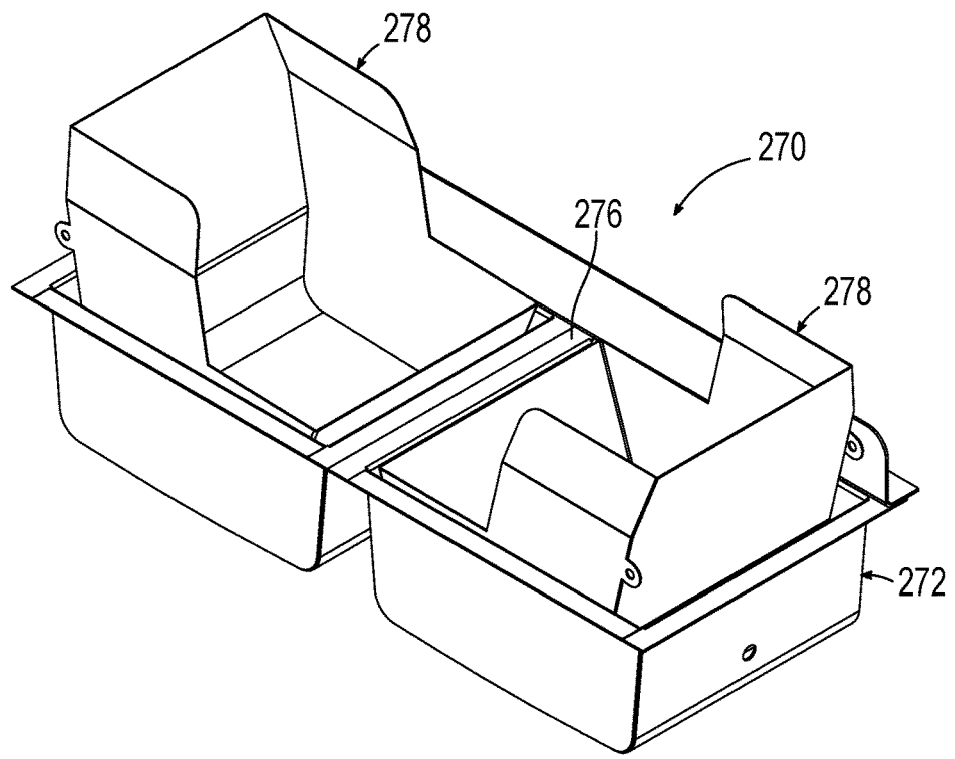
FIG. 30 is a top perspective view of another embodiment of an automatic cooking system of the invention, including separated cooking chambers and baskets in the cooking chambers in a first position for cooking food product.
Figure 31:
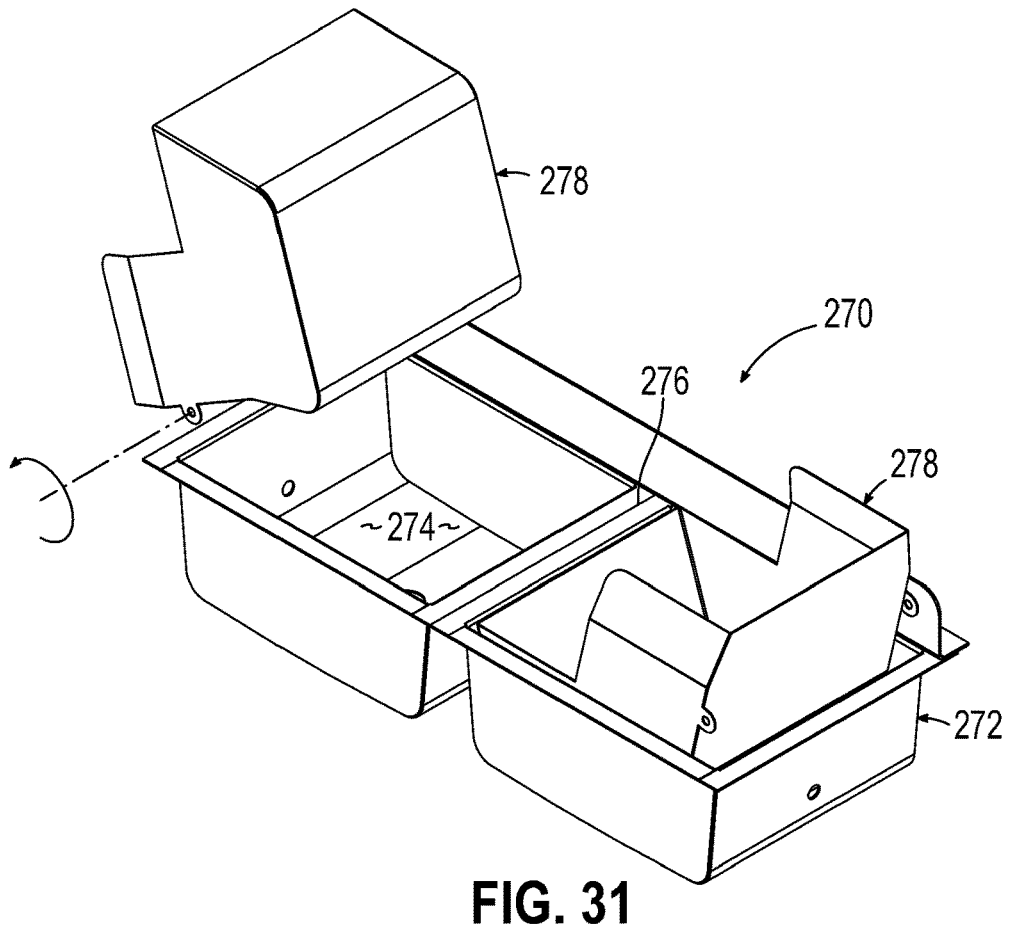
FIG. 31 is a top perspective view of the cooking system of FIG. 30, with one of the baskets moved to a second position to dump food product from the cooking chamber.
Figure 32:
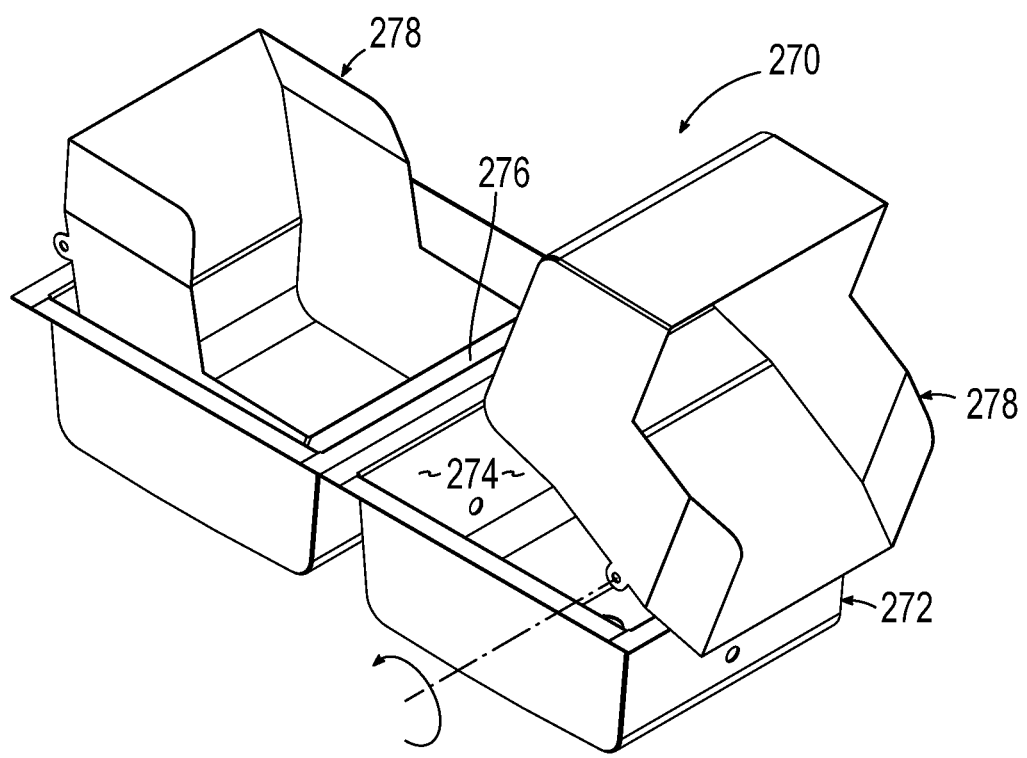
FIG. 32 is a top perspective view of the cooking system of FIG. 30, with another of the baskets moved to a second position to dump food product from the cooking chamber.

One further embodiment of an automatic cooking system 270 in accordance with the invention is shown in FIGS. 30 through 32, and once again, this cooking system 270 includes a cooking vat 272. Instead of a lane, the cooking vat 272 of this embodiment defines two cooking chambers 274 separated by a middle wall 276 of the cooking vat 272. It will be understood that more or fewer than two cooking chambers 274 may be provided in other embodiments. Within each of the cooking chambers 274, a rotatable basket 278 is mounted so that the basket 278 can pivot relative to the cooking vat 272. These baskets 278 are substantially identical to those described above in the embodiment of FIGS. 20 and 21, including the chute-like configuration for dumping food product out of the cooking chamber 274 when a cooking cycle is complete. The baskets 278 are shown in the base position for cooking food products in FIG. 30, and then each of the two baskets 278 is shown individually rotated to a dump position in FIGS. 31 and 32 to move the cooked food product to a holding or packaging station outside the cooking vat 272. As with prior embodiments, a main controller of the cooking system 270 can individually pivot the baskets 278 when needed to move the food product. The baskets 278 allow for the avoidance of manual intervention when managing the cooking process and moving food product, thereby improving the functionality and reliability of automatic cooking systems.

The various embodiments of automatic cooking systems described herein address many of the shortcomings of prior designs by improving upon recent developments in the fryer technology. To this end, improved oil span life and reduced oil use can be achieved, as well as reliable movement of food product into, out of, and through a cooking vat. Regardless of the combination of features used from the embodiments above, the cooking system and method of the present invention achieves these technical effects.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An automatic cooking system for frying food products, comprising:
   a cooking vat configured to hold a cooking medium and to receive food product, the cooking vat defining at least one lane extending between an inlet end where the food product is inserted into the cooking vat and an outlet end where the food product is removed from the cooking vat, wherein each of the at least one lane of the cooking vat includes a bottom surface and sidewalls extending along the at least one lane, with chamfered corner surfaces connecting to the bottom surface and the sidewalls at an angle, wherein the bottom surface of each of the at least one lane in the cooking vat is angled upwardly along at least a portion of a length from the inlet end to the outlet end;
   a heating element coupled to the cooking vat and configured to transfer heat into the cooking medium to uniformly heat the cooking medium;
   an oil recirculation and filtration system including a pump in communication with the inlet end and the outlet end of the cooking vat, the oil recirculation and filtration system configured to generate a continuous flow of cooking medium from the inlet end to the outlet end; and
   at least one gate located in the cooking vat and separating the at least one lane into separate portions, each of the at least one gate being configured to allow cooking medium flow therethrough, and also being configured to move between a closed position blocking flow of food product between adjacent portions of the at least one lane and an open position permitting flow of food product driven by the continuous flow of cooking medium past the at least one gate to an adjacent portion of the at least one lane,
   wherein the heating element and at least one gate are positioned and configured to avoid impeding of the continuous flow of cooking medium in the at least one lane in such a manner that would generate turbulent flow, such that the continuous flow of cooking medium over the bottom surface and chamfered corner surfaces and through the at least one lane avoids turbulence that can oxidate and reduce life span of the cooking medium.

2. The automatic cooking system of claim 1, wherein the cooking vat is subdivided into separate portions by at least two gates.

3. The automatic cooking system of claim 1, wherein each of the at least one gate includes a plurality of flow apertures to allow the continuous flow of cooking medium through a length of the at least one lane without generation of turbulence in the continuous flow of cooking medium.

4. The automatic cooking system of claim 1, wherein the bottom surface of each of the at least one lane in the cooking vat is angled upwardly along an entirety of the length from the inlet end to the outlet end.

5. The automatic cooking system of claim 1, wherein the heating element is positioned on an external side of the cooking vat so as to transfer heat energy by conduction through the cooking vat and into the cooking medium.

6. The automatic cooking system of claim 1, wherein the heating element is positioned within the cooking vat along the bottom surface so as to transfer heat energy directly into the cooking medium, and the heating element defining a low profile to avoid impedance of the continuous flow of cooking medium in the at least one lane.

7. The automatic cooking system of claim 1, wherein each of the at least one lane is approximately 6 inches wide between the sidewalls and approximately 5 inches wide at the bottom surface, so as to contain about 10 pounds of cooking medium volume.

8. The automatic cooking system of claim 1, wherein each of the at least one gate is rotatably coupled with the cooking vat to pivot between the closed and open positions.

9. The automatic cooking system of claim 8, wherein each of the at least one gate is coupled to a support rod that defines a rotational axis for movement of the at least one gate, the support rod being configured to be driven rotationally by a drive.

10. The automatic cooking system of claim 1, wherein each of the at least one gate is removably coupled to the cooking vat so as to allow for removal of the at least one gate and cleaning of the cooking vat.

11. The automatic cooking system of claim 10, wherein each of the at least one gate includes a spring release mechanism for selectively and removably engaging the at least one gate to the cooking vat.

12. An automatic cooking system for frying food products, comprising:
- a cooking vat configured to hold a cooking medium and to receive food product, the cooking vat defining at least one lane extending between an inlet end where the food product is inserted into the cooking vat and an outlet end where the food product is removed from the cooking vat;
- a heating element coupled to the cooking vat and configured to transfer heat into the cooking medium;
- a dividing and movement device located in the cooking vat, which divides the at least one lane into separate portions, and also selectively actuates to automatically and positively move batches of the food product between the separate portions of the at least one lane as well as out of the cooking vat from the outlet end when a cooking process is completed, wherein the dividing and movement device further comprises a conveyor including a belt that extends along a length of the at least one lane and paddles that project outwardly from the conveyor, wherein the paddles divide the at least one lane into separate portions, and the conveyor rotates to move the paddles along the at least one lane to move batches of the food product; and
- an outlet basket positioned to receive a batch of the food product from the conveyor following a cooking process, the outlet basket configured to rotate relative to the cooking vat to remove the batch of the food product from the cooking vat.

13. The automatic cooking system of claim 12, wherein the heating element is positioned on an external side of the cooking vat so as to transfer heat energy by conduction through the cooking vat and into the cooking medium.

14. The automatic cooking system of claim 12, wherein the heating element is positioned within the cooking vat along a bottom surface so as to transfer heat energy directly into the cooking medium.

15. An automatic cooking system for frying food products, comprising:
- a cooking vat configured to hold a cooking medium and to receive food product, the cooking vat defining at least one lane extending between an inlet end where the food product is inserted into the cooking vat and an outlet end where the food product is removed from the cooking vat, wherein each of the at least one lane of the cooking vat includes a bottom surface and sidewalls extending along the at least one lane;
- a heating element coupled to the cooking vat and configured to transfer heat into the cooking medium;
- an oil recirculation and filtration system including a pump in communication with the inlet end and the outlet end of the cooking vat, the oil recirculation and filtration system configured to generate a continuous flow of cooking medium from the inlet end to the outlet end; and
- at least one gate located in the cooking vat and separating the at least one lane into separate portions, each of the at least one gate being configured to allow cooking medium flow therethrough, and also being configured to move between a closed position blocking flow of food product between adjacent portions of the at least one lane and an open position permitting flow of food product driven by the continuous flow of cooking medium past the at least one gate to an adjacent portion of the at least one lane,
- wherein each of the at least one gate is removably coupled to the cooking vat so as to allow for removal of the at least one gate and cleaning of the cooking vat, and wherein each of the at least one gate includes a spring release mechanism for selectively and removably engaging the at least one gate to the cooking vat.

16. The automatic cooking system of claim 15, wherein each of the at least one gate is rotatably coupled with the cooking vat to pivot between the closed and open positions.

17. The automatic cooking system of claim 16, wherein each of the at least one gate is coupled to a support rod that defines a rotational axis for movement of the at least one gate, the support rod being configured to be driven rotationally by a drive.

18. An automatic cooking system for frying food products, comprising:
- a cooking vat configured to hold a cooking medium and to receive food product, the cooking vat defining at least one lane extending between an inlet end where the food product is inserted into the cooking vat and an outlet end where the food product is removed from the cooking vat;
- a heating element coupled to the cooking vat and configured to transfer heat into the cooking medium; and
- a dividing and movement device located in the cooking vat, which divides the at least one lane into separate portions, and also selectively actuates to automatically and positively move batches of the food product between the separate portions of the at least one lane as well as out of the cooking vat from the outlet end when a cooking process is completed, wherein the dividing and movement device further comprises a series of gates positioned sequentially along a length of the at least one lane, wherein each gate of the series of gates is pivotally coupled to the cooking vat so that each gate of the series of gates can rotate to selectively hold batches of the food product in a corresponding portion of the at least one lane for cooking, and then selectively and positively move the batches of the food product into another portion of the at least one lane,
- wherein each gate of the series of gates is either flexible or spring-loaded so as to allow complete contact with adjacent portions of the cooking vat during rotation to move the batches of the food product.

19. The automatic cooking system of claim 18, further comprising:
- an outlet basket positioned to receive a batch of the food product from the series of gates following a cooking process, the outlet basket configured to rotate relative to the cooking vat to remove the batch of the food product from the cooking vat.

* * * * *